(12) United States Patent
Sheng

(10) Patent No.: US 10,500,447 B2
(45) Date of Patent: Dec. 10, 2019

(54) FIBER COMPOSITE AND PROCESS OF MANUFACTURE

(71) Applicant: Hsu Chien Sheng, Fairfield, CT (US)

(72) Inventor: Hsu Chien Sheng, Fairfield, CT (US)

(73) Assignee: Xene Corporation, Westbury, NY (US)

( * ) Notice: Subject to any disclaimer, the term of this patent is extended or adjusted under 35 U.S.C. 154(b) by 1019 days.

(21) Appl. No.: 13/667,963

(22) Filed: Nov. 2, 2012

(65) Prior Publication Data

US 2013/0274037 A1 Oct. 17, 2013

Related U.S. Application Data

(63) Continuation of application No. 12/964,690, filed on Dec. 9, 2010, now Pat. No. 8,328,666, which is a
(Continued)

(30) Foreign Application Priority Data

Jun. 18, 2009 (CN) .......................... 2009 1 0040320

(51) Int. Cl.
*A63B 49/10* (2015.01)
*A63B 49/11* (2015.01)
(Continued)

(52) U.S. Cl.
CPC .............. *A63B 49/11* (2015.10); *A63B 60/00* (2015.10); *B29C 44/16* (2013.01); *B29C 70/446* (2013.01);
(Continued)

(58) Field of Classification Search
CPC ....... B29C 70/68; B29C 70/446; B29C 44/16; B29C 44/18
See application file for complete search history.

(56) References Cited

U.S. PATENT DOCUMENTS 2,977,639 A * 4/1961 Barkhuff, Jr. ........... B29C 44/16
156/245
2,989,783 A * 6/1961 Slapnik ................... B29C 44/16
264/257
(Continued)

FOREIGN PATENT DOCUMENTS

| EP | 77134 A1 | 4/1983 |
| EP | 401498 A2 | 12/1990 |
| EP | 579881 A1 | 1/1994 |

OTHER PUBLICATIONS

Whinnery, L, S. Goods, and B. Even, Expancel Foams: Fabrication and Characterization of a New Reduced Density Cellular Material for Structural Applications, Sandia Report SAND2000-8217 (Aug. 2000), 30 pages.*

*Primary Examiner* — Matthew J Daniels

(57) ABSTRACT

The inventive fiber manufacturing process is particularly adapted for demanding applications such as sports racquets. Because of the improved strength to weight ratio of components formed using the inventive method, a wide range of flexibility is achieved, allowing use of the inventive process to manufacture, for example, a fiber reinforced (for example, graphite) modular sports racquet, optionally provided with user-selectable weights and/or handle replacements. The inventive fiber (for example, graphite fiber) racquet frame is filled with a plastic foam and is formed using, for example, microencapsulation technology to time, generate and apply the pressure and gives the same or greater strength for a given size compared to conventional racquets. Advantageously, an outer tubular member may be used to form the racquet frame, with an inner tubular member extending around the head of the racquet frame.

11 Claims, 22 Drawing Sheets

Related U.S. Application Data continuation of application No. PCT/US2010/038664, filed on Jun. 15, 2010.

(60) Provisional application No. 61/285,051, filed on Dec. 9, 2009.

(51) Int. Cl.

| | | |
|---|---|---|
| *A63B 60/00* | (2015.01) | |
| *B29C 44/16* | (2006.01) | |
| *B29C 70/44* | (2006.01) | |
| *B29C 70/68* | (2006.01) | |
| *B29L 31/52* | (2006.01) | |
| *A63B 49/035* | (2015.01) | |
| *A63B 60/10* | (2015.01) | |
| *A63B 49/032* | (2015.01) | |
| *A63B 60/02* | (2015.01) | |
| *A63B 60/06* | (2015.01) | |
| *A63B 60/54* | (2015.01) | |
| *A63B 60/08* | (2015.01) | |
| *A63B 60/42* | (2015.01) | |

(52) U.S. Cl.
CPC ............ *B29C 70/68* (2013.01); *A63B 49/032* (2015.10); *A63B 49/035* (2015.10); *A63B 49/10* (2013.01); *A63B 60/02* (2015.10); *A63B 60/06* (2015.10); *A63B 60/08* (2015.10); *A63B 60/10* (2015.10); *A63B 60/42* (2015.10); *A63B 60/54* (2015.10); *A63B 2209/02* (2013.01); *A63B 2209/023* (2013.01); *B29L 2031/5245* (2013.01); *B32B 2307/544* (2013.01); *B32B 2307/558* (2013.01); *B32B 2309/12* (2013.01); *Y10T 156/103* (2015.01)

(56) References Cited

U.S. PATENT DOCUMENTS

| | | | |
|---|---|---|---|
| 3,949,988 A | * | 4/1976 | Staufer .................. A63B 49/11 264/314 |
| 3,981,504 A | | 9/1976 | Gugel |
| 4,070,021 A | * | 1/1978 | Cecka .................... A63B 49/10 264/45.3 |
| 4,082,274 A | | 4/1978 | Stevens |
| 4,124,670 A | | 11/1978 | Cecka |
| 4,129,634 A | | 12/1978 | Cecka et al. |
| 4,212,461 A | | 7/1980 | Cecka |
| 4,292,101 A | | 9/1981 | Reichert |
| 4,360,202 A | | 11/1982 | Lo |
| 4,389,269 A | | 6/1983 | Cooper |
| 4,460,423 A | | 7/1984 | Bosnia |
| 4,511,523 A | | 4/1985 | Hsu |
| 4,853,172 A | * | 8/1989 | Jacaruso ............... B29C 70/446 264/257 |
| 4,891,081 A | * | 1/1990 | Takahashi ........... B29C 44/1214 156/78 |
| 4,931,247 A | | 6/1990 | Yeh |
| 5,006,298 A | | 4/1991 | Tsai |
| 5,487,806 A | | 1/1996 | Viellard |
| 5,540,877 A | | 7/1996 | Repetto |
| 5,897,447 A | | 4/1999 | Nishihara |
| 5,922,255 A | | 7/1999 | McLeod |
| 6,302,812 B1 | | 10/2001 | Perry |
| 6,440,016 B1 | | 8/2002 | Chang |
| 6,896,320 B2 | | 5/2005 | Kropfeld |
| 7,661,603 B2 | | 2/2010 | Yoon et al. |
| 2003/0144071 A1 | | 7/2003 | Dodge et al. |
| 2005/0266940 A1 | | 12/2005 | Filippini |
| 2010/0212805 A1 | | 8/2010 | Yoneyama |
| 2011/0136602 A1 | | 6/2011 | Hsu et al. |

\* cited by examiner

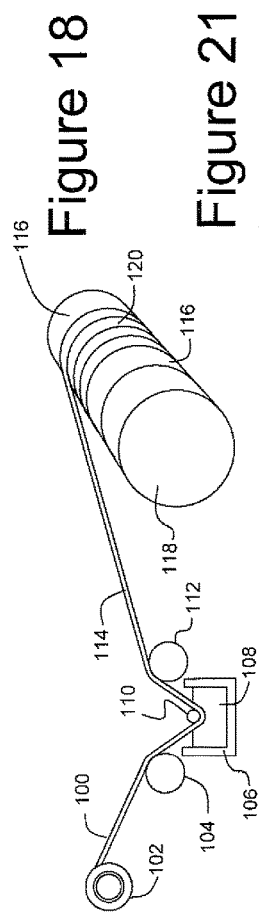
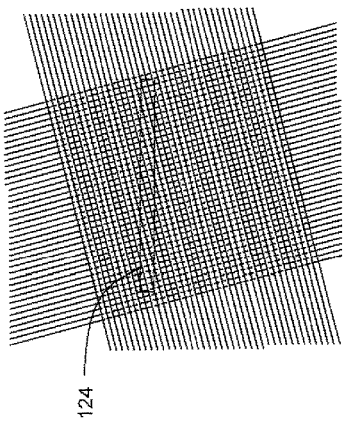
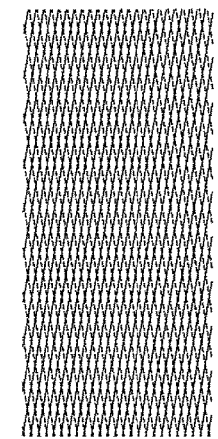
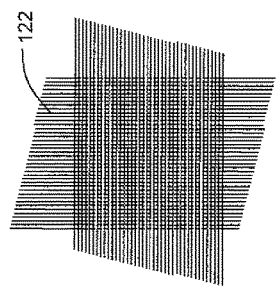

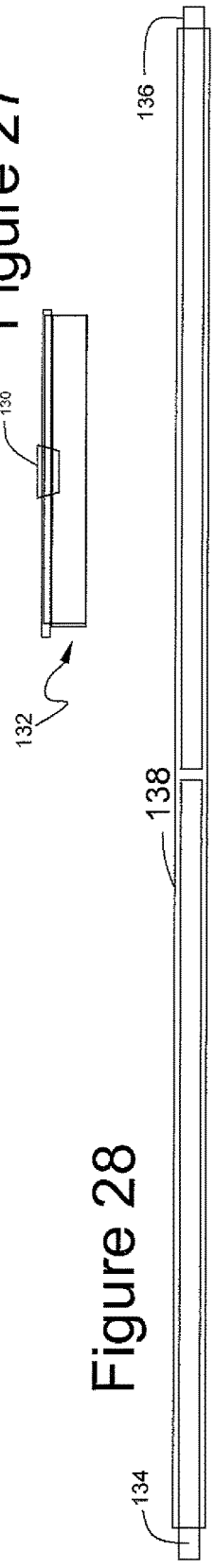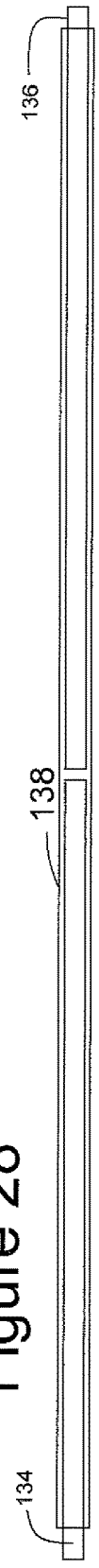
Figure 25
Figure 26
Figure 27
Figure 28

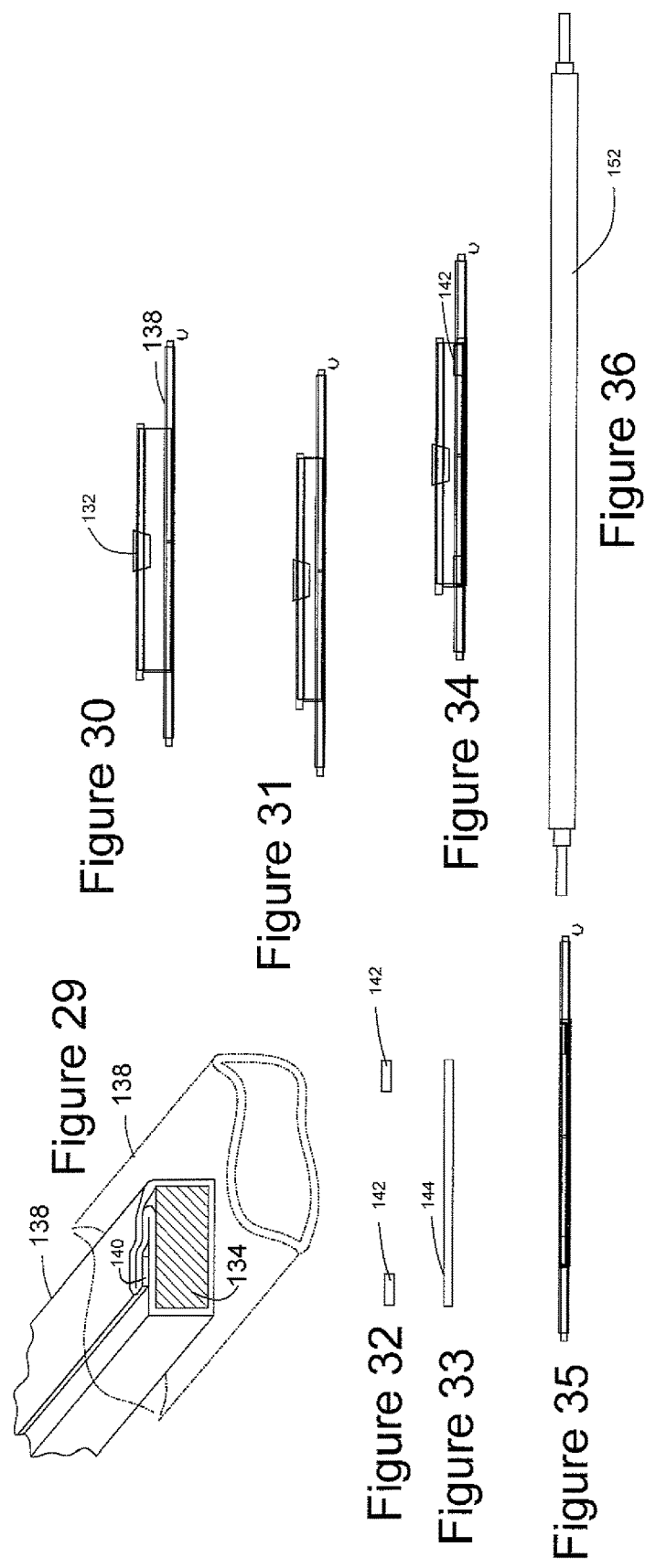

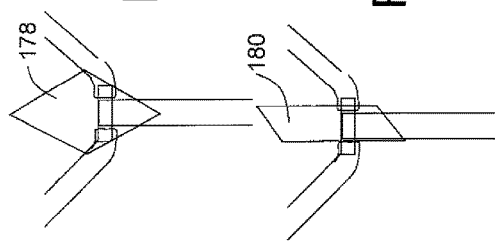
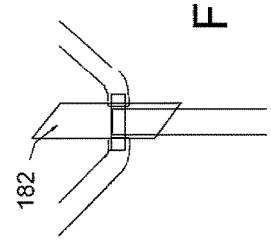
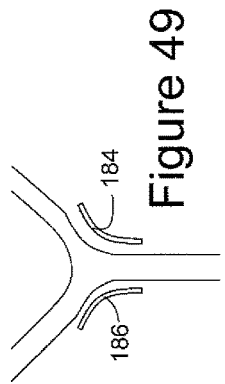
Figure 46
Figure 47
Figure 48
Figure 49
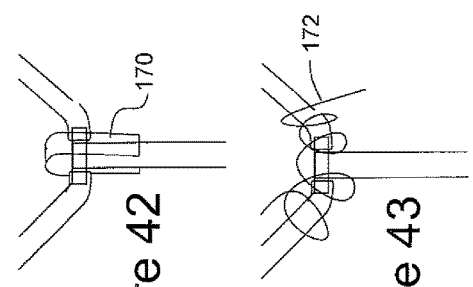
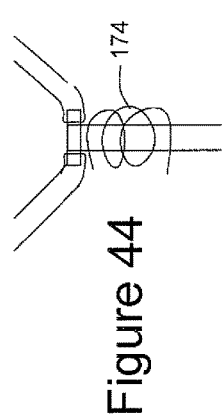
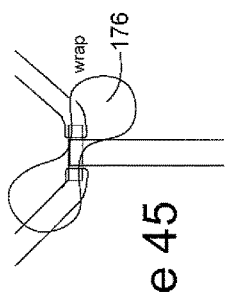
Figure 42
Figure 43
Figure 44
Figure 45

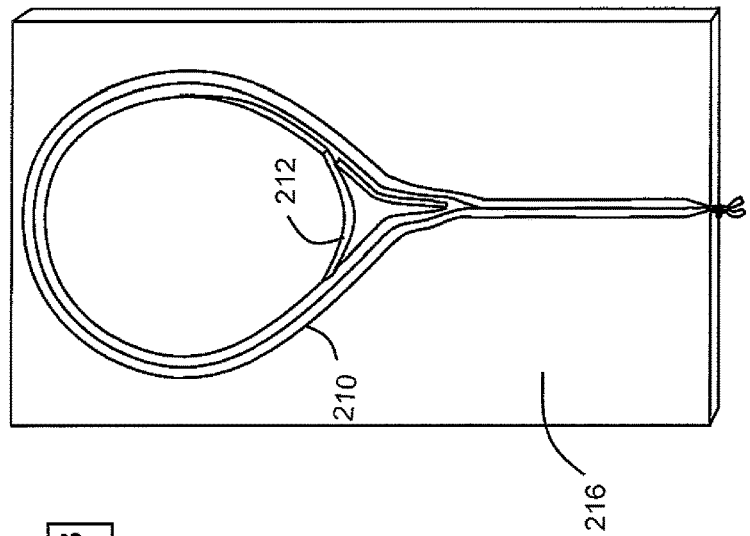
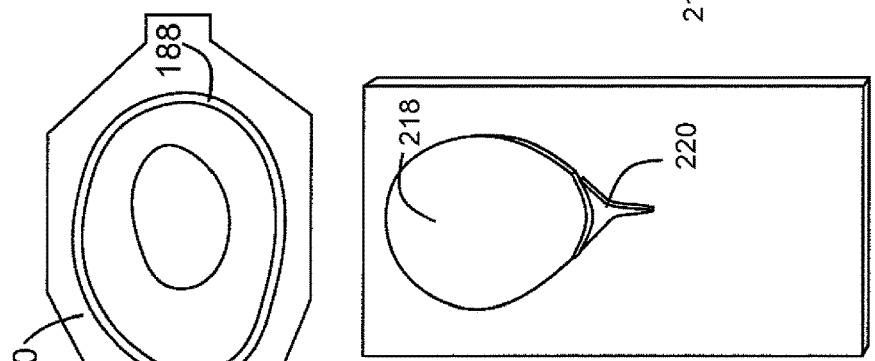
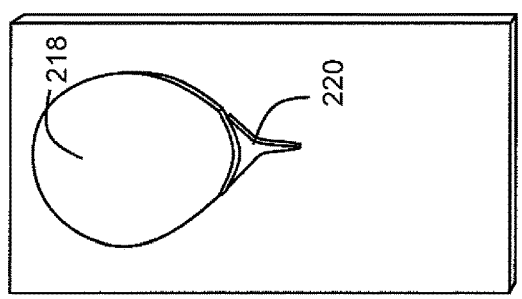
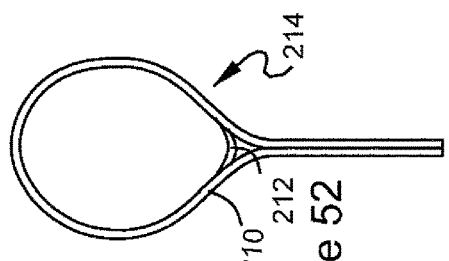
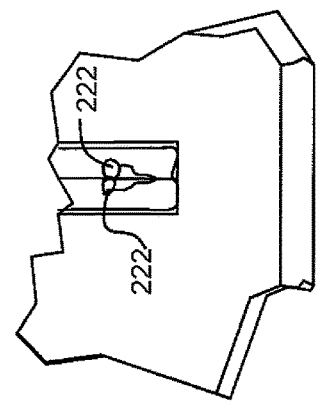
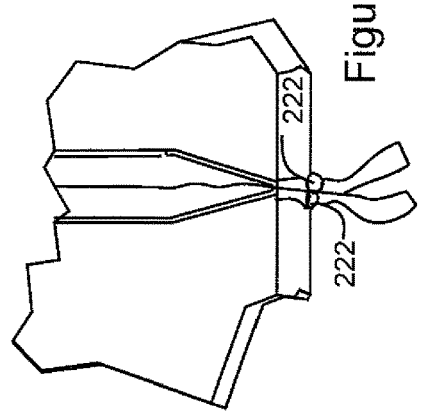

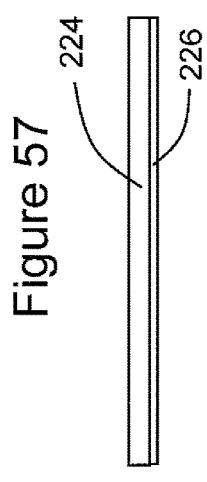
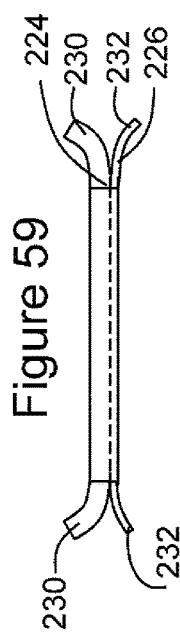
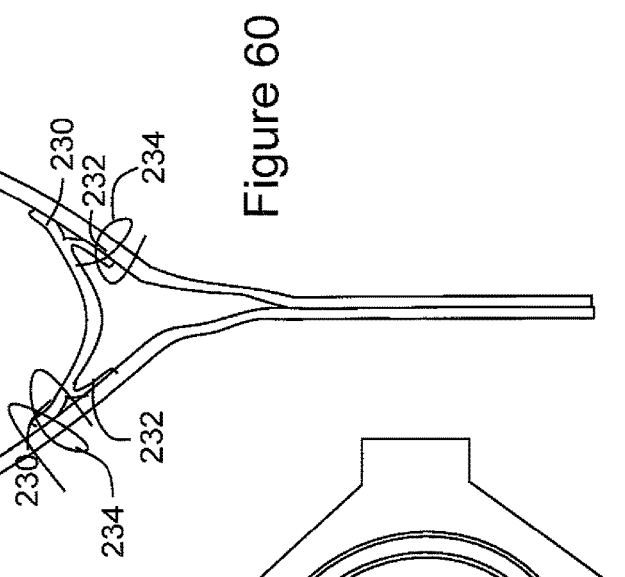
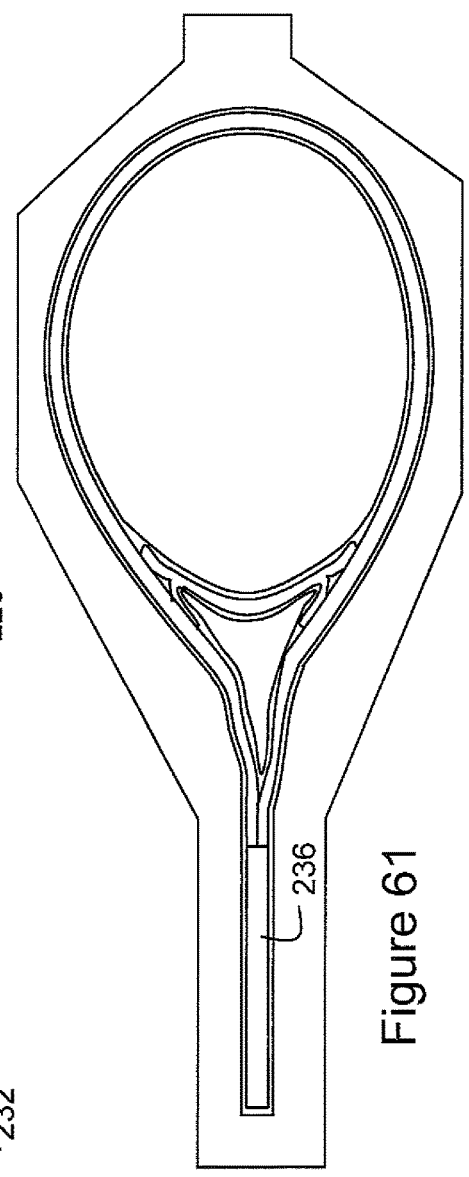

US 10,500,447 B2

FIBER COMPOSITE AND PROCESS OF MANUFACTURE

CROSS REFERENCE TO RELATED APPLICATIONS

This application is a continuation-in-part of PCT application No. PCT/2010/038664, which in turn claims priority of Chinese patent application number 200910040320.9, filed on Jun. 18, 2009 in the People's Republic of China, and the priority of U.S. Provisional Patent Application No. 61/285,051, filed on Dec. 9, 2009, the disclosures of which are incorporated herein by reference.

TECHNICAL FIELD

The invention relates to apparatus and methods for graphite resin composite members, such as sports raquet frames, golf club shafts and bicycle frames.

STATEMENT REGARDING FEDERALLY SPONSORED RESEARCH OR DEVELOPMENT (Not applicable)

BACKGROUND OF THE INVENTION

For many years, graphite composite sports racquet frames have been produced by manual labor in molds using air injection. In a typical process, a "layup" is created by manually rolling multiple sheets or laminations (which take the form of strips of planar material), commonly formed of fibrous material, such as carbon or graphite fiber or fiberglass, to form a bladder. The bladder is formed, for example, using a number of "sheets" of graphite fiber, permeated, for example saturated, with an uncured thermoplastic or thermosetting resin. Generally, the sheets are wrapped by hand around a rigid mandrel or rod to control the desired layup shape, which is usually in the shape of a tube.

Before the graphite is wound on the mandrel, the mandrel is wrapped with a layer of material meant to form the internal surface of a layup bladder to be inflated during the manufacturing process as set forth below. The sheets are made of carbon fibers and, as alluded to above, permeated with an uncured plastic resin. These carbon fiber/resin sheets are manually cut into strips or ribbons prior to their assembly into a layup, typically by being wound around a mandrel to form a tube. After being wound, the layup (which, after winding, takes the form of a bladder) is manually formed into a desired racquet shape, reinforced with additional patches of the planar strips of carbon fiber permeated with resinous material, and placed in a mold. By resinous material is meant any material which can be used in graphite or fiberglass composite to bind the fibers into a substantially rigid structure.

The mold is then manually closed. The bladder is subjected to heat by the mold, causing the thermoplastic resin to cure. The result in the finished racquet is a hardening of the material of the layup. Alternatively, thermosetting resins may be used.

The bladder is then inflated with a manually placed single air nozzle, which is individually attached to one end of the bladder. The nozzle feeds, for example, air pump generated compressed air to force the walls of the layup to the interior walls of the mold cavity. See Hsu, U.S. Pat. No. 4,511,523 (1985). Because both ends of the layup are formed with an open configuration, the terminal end of the layup opposite the end being inflated by the nozzle is coupled, for example, to a capping or other sealing structure or artifice, allowing the buildup of pressure in the layup. The mold is then heated to cure the thermoplastic resin.

An artifact of this process is that composite racquet frames are commonly of a single-tube design. The two ends of the layup tube may be, for example in the case of tennis racquets, at the bottom of the racquet. In other words, the tube begins at the base of the tennis racquet handle, proceeds in a substantially straight direction along the length of the tennis racquet handle, extends around the oval string supporting frame shape and continues contiguous with the initial portion of the tube in a substantially straight direction back to the base of the tennis racquet handle. Typically, the base of the handle is cut at its end with a saw and a pair of gripping members secured around those portions of the tube ends which define the tennis racquet handle. Because of the requirement of air injection, the tubular basic shape is required to blow air through the entire tube which means the immediate output product is hollow with the above technique and necessarily has an open ended shaft at the bottom or base of the tennis racquet handle.

While it may be possible, in principle to the form a multiple-tube composite structure, it has been found that any internal divisions, bridges or lumens placed in these tubes are difficult to control in their placement because of variations in bladder air pressure and layup characteristics along the length of the layup. Attempts to include them in the past have been found to cause significant quality control and production problems.

On the one hand, due to the hollow nature of graphite racquets, a minimum cross-sectional width is required in, for example, the hoop or head portion of the tennis racquet in order to enable the tennis racquet to be strong enough to withstand the powerful strokes typical of the game. For example, professional tennis players can achieve ball speeds of 150 mph during a serve.

On the other hand, thinner frames are desirable because of the increase in swing speed, head speed, control and feel. The quality of the material which forms the racquet frame manufactured using the current state-of-the-art the air pressure process is such that the resulting hollow frame is limited to a minimum width, typically about 19 mm.

SUMMARY OF THE INVENTION

Quite apart from the strength of the material of which the tennis racquet is made, in accordance with the invention it is also believed that the hollow nature of present state-of-the-art graphite racquets, in comparison to earlier generation solid wooden racquets, have increased injury to shoulders and elbows due to vibration and shock, particularly from off-center shots. This is because the hollow frame and open ended shaft at the handle is coupled, during play, to the hand and then to the arm.

In accordance with the invention, the opening for air injection at the bottom of the shaft is believed to worsen the shock that resonates at the handle of the racquet and propagates to and through the hand, arm and shoulder of the player.

Years of industry development have been invested to address the minimization of these propagated vibrations and shock, by implementing various methods of dampening the transmission of vibration from the handle of the racquet to the hand of the player.

The invention addresses these issues by providing a carbon composite frame structure of increased strength and reliability, providing the frame head and handle with an inner core of foam plastic and, optionally, providing for a truly closed end at the base of the racquet handle.

In accordance with the invention, it is believed that closing the ends of the racquet may further improve this aspect of the performance of a sports racquet.

Solid wooden racquets, compared to graphite racquets, absorb the shock and as a result, the prior generation of wooden racquets did not produce the number of shoulder and elbow injuries associated with hollow graphite racquets. In accordance with the invention, it is believed that the air injected graphite era of racquet manufacturing has produced a considerably higher incidence of elbow and shoulder injuries, not only due to the hollow nature of conventional graphite racquet technology, but also because of the open ended shaft at the end of the handle.

Conventional hollow racquets are also particularly prone to propagate vibration and shock associated with off-center shots because the energy from the "mishit" feeds into the hollow frame. The inventive solid frame on the other hand reduces this shock and increases the size of the "sweet spot" on the frame because the energy of the off center shot does not propagate well, into or through the inventive frame. In accordance with the invention, the combination of a thinner and solid racquet also creates a larger "sweet spot" because it diminishes the propagation of shock. The result is surprisingly increased "forgiveness" for off-center shots.

The implementation of a sports racquet with a foam core is not unknown. U.S. Pat. No. 4,129,634 to Cecka (1978) discloses the use of a foam plastic material to form an internal filler member within the core of the head of a sports racquet. However, over the many years of graphite racquet manufacture, such foam technology has not, to the knowledge of the inventor, seen substantial commercial implementation within the critical structure surrounding the head of the racquet that supports the strings.

In accordance with the invention, foam type materials are used to pressurize and mold the graphite. However, the mere use of foam to pressurize and mold the graphite is not sufficient. For example, the curing temperature of carbon resin is typically in the range of 130 degrees Celsius. The foaming agent must be of a type which substantially does not expand before the temperature needed to cure, for example, up to six layers of carbon fibers, is reached. Likewise, it is believed that expansion must be relatively rapid, because slow expansion may create pitching of the fibers in the frame structure while it is curing in the mold.

A racquet might also fail to perform satisfactorily if the layer lamination pressure is not enough. Likewise, if the foaming material density is too high, even though the expansion rate reaches the required level, it may not meet the lightweight target for a particular carbon fiber product. The expansion coefficient of the foam plastic forming material used in accordance with the invention, Expancell 152 is believed to be about 60 to 1. Solid foam materials which have expansion ratios in the range of about 2 to 1 have been found not to produce racquets of sufficient strength. Jellied type foam materials having expansion ratios in the range of about 10 to 1, while measurably improved, are also less than ideal. Surprisingly, micro encapsulated foaming plastic materials provide good strength in the finished product and excellent playing characteristics, probably due to a combination of the cellular plastic structure and the pressure applied.

Implementation of the invention may be varied depending upon the requirements of a particular application, some of which may tolerate weight (for example certain tennis racquets meant for players who prefer a heavier racquet), and others of which may not require as much strength, but might benefit from cost savings associated with using less carbon fiber (for example badminton racquets, which are a much less critical application).

It has also been discovered in accordance with the invention that if the expansion temperature is too high, it will cause difficulties in molding. When the expansion rate is too low, this can adversely affect the strength of the carbon fiber member because of pitching.

Thus, while the formation of a sports racquet frame using a foam plastic material (to apply pressure to the carbon fiber and resin layup during formation and after formation to reduce vibration), under a broad range of conditions employing a wide variety of materials, will result in a playable racquet frame, a racquet with superior performance can be achieved if the above parameters are followed.

Nozzle applied air pressure has been industry practice in manufacturing graphite racquets for the many years. Because the air nozzle must be attached manually, and because of the inconsistencies with which the air nozzle fits into the latter, the process cannot be efficiently mechanized.

The process of making the racquet in accordance with the invention uses a micro encapsulated plastic material, including a foaming agent in the form of a powdered material, to form the foam plastic. This material is put into the tubular layup bladder which is sealed at both ends. The bladder is then put in an iron mold which is then heated. This results in the material being heated, causing it to melt and expand under the pressure of a foaming agent contained therein.

Because no nozzle injection of air is involved, the labor associated with making this connection is eliminated, and the manufacturing process is made substantially more uniform and less time-consuming. This aspect of the invention also presents the opportunity of mass-producing the racquet frame, for example in a completely automated process.

In accordance with the invention, it is noted that the foaming of the plastic which forms the foam plastic inner core of the racquet occurs at a temperature roughly about the temperature required for the curing and fusing of layers of the carbon fiber/thermoplastic resin sheets which form the layup bladder, although somewhat higher temperatures can be tolerated. The particular temperatures are a function of the material being used to form the foam plastic and may be obtained by routine trial of the same and checking the final product to be verify that the temperature has not been excessive.

In accordance with the invention, one fills the layup with the powder microcapsule foaming plastic material, which does not begin to expand, in the examples set forth below, until the temperature reaches 120-130 degrees Centigrade, for example 130° C. At the same time, the gas generate pressure, inside the layup bladder which is sealed at both ends, due to the foaming action of the micro encapsulated material inside the bladder. This makes the fiber layer laminations, which form the racquet frame in the finished product, press up against the inside surface of the mold to take the shape of the mold cavity.

It is understood that when heat is applied, the micro encapsulated foaming agent expands and deforms the capsules enclosing it, thus forming a foam plastic under pressure. This results in creating enough pressure to press the layers of graphite carbon fiber against the mold walls to form the carbon fiber into the shape of the cavity of the mold. The combination of heat and pressure results in fusing of the layers and the formation of the composite material of which the racquet frame is made. This occurs at the temperature of about 120-130 degrees Celsius. This temperature range may vary depending upon the characteristics of the thermoplastic material forming the carbon fiber sheet.

In accordance with a preferred embodiment, the temperature, at which the micro capsules expand and allow the foaming agent to form the foam plastic, is about 130-135° C., although suitable results can be achieved at temperatures well above that level. Likewise, if the thermoplastic resin in the sheets incorporating the carbon fibers have a sufficiently low softening point, lower temperatures may be used.

The plastic foam created when the powder micro encapsulated foam plastic material is heated, when cooled, will substantially hold its volume and not shrink. After cooling, the plastic material thus solidifies in the shape of the inside of the mold cavity.

It has been found that the inventive method of using a foam plastic material, which, when heated, forms a foam plastic which is caused to expand close to or above the temperature at which the plastic material, incorporated into the graphite fibers, cures and fuses, in addition to eliminating the need for handwork in the attachment of an air nozzle (as well as the associated problems and irregularities associated therewith), also achieves a superior weight to strength ratio in the composite fiberglass material.

The inventive method thus allows the formation of a racquet frame with the same strength as a wider (for example in cross-section) conventional frame, and at the same time eliminates the problems associated with manufacturing methods employing nozzle-supplied air pressure.

In accordance with the invention, it is noted that similar equivalent techniques may be used. For example, a micro-encapsulated foaming agent may be put in a frangible shell and mixed with powdered plastic which would melt before the microcapsules would break and release the foaming agent. Alternatively, the microcapsules may only melt at the desired temperature and fuse with particles of the plastic powder. By using various combinations of plastic and microcapsules a variety of plastic characteristics can be achieved, including strength, flexibility, damping, weight rigidity, compressibility, density and so forth. For example, a rubbery material may be incorporated with microcapsules filled with pentane to increase shock and vibration absorption. Alternatively, a rubbery material may be used for the microcapsules.

Alternatively, the recipe may also include elongated plastic particles which are selected for rigidity and which may also have characteristics which result in their not melting during the generation of pressure during the foaming process for the purpose of fusing multiple layers of carbon fiber. A rubbery material optionally included in the recipe would result in shock and vibration absorption, while a desired rigidity would be provided by the elongated plastic particles.

Still another possibility is the incorporation of elongated particles which may be oriented. For example, elongated electret particles, which will not melt or lose their polarity at the temperatures needed for graphite racquet formation, may be introduced into the mixture of microcapsules and oriented by electric fields while still in the molten configuration, thus resulting in orientations which could address particular needs in terms of strength, damping, and so forth. For example, this technique may be used to form a bicycle frame in which different orientations of particle electrets are achieved by applying electrical fields of corresponding orientation to different parts of the frame to address the stresses formed at those parts of the frame during use.

Conventional tennis racquets also come in a variety of grip sizes, grip shapes, weight, balance and swing weight configurations. Racquets with different configurations are typically done at the manufacturer level because modifications in the field or by consumers are difficult. The result is that stores are compelled to carry large inventories of various types of tennis racquets. This also means that the distribution system is inefficient and results in extra costs in the supply chain. The modular aspect of the inventive racquet allows it to be easily customizable into various configurations which address this deficiency of current products.

The inventive resin and fiber composite may comprise an outer shell defining a cavity, the outer shell comprising a plurality of layers of fibers. A first resinous material is disposed between the fibers and secures the fibers to each other. A second resinous material is disposed inside the cavity, the second resinous material being configured and dimensioned to define voids within the cavity between portions of the second resinous material. A gaseous material is contained within the voids, the gaseous material being under a pressure in excess of 20 psi, but more preferably 30 pounds per square inch, and most preferably in excess of 40 psi.

A foaming agent is disposed in the cavity. The foaming agent and the second resinous material are adapted to interact during curing to create a resinous structure configured and dimensioned to define the voids within the cavity between portions of the second resinous material.

An inventive resin and fiber layup, comprises a plurality of layers of fibers configured as a closed bladder which defines an internal cavity within the bladder. A quantity of a first resinous material is disposed between the fibers and is adapted to be cured to secure the fibers to each other. A second resinous material disposed inside the cavity. A foaming agent is disposed in the cavity. The foaming agent and the second resinous material are adapted to interact during curing to create a resinous structure configured and dimensioned to define voids within the cavity between portions of the second resinous material. The voids may be closed or open cell voids.

The fibers may be in layers with different orientations. A layer of an air impermeable of material may be disposed in the cavity positioned between the second resinous material and the plurality of layers of fibers.

The cavity may be a closed cavity. The gaseous material may be under a pressure in excess of 5 $kg/cm^2$, for example in excess of 20 pounds per square inch, preferably more than 30 psi, and upon information and belief most preferably greater, perhaps in excess of 40 or 50 psi, or as large as the pressure created in the embodiments described below in connection with a tennis racket main frame layup provided with 25 grams of Expancell 152. For many applications pressures in the range of 5-15 $kg/cm^2$ will yield excellent results.

One or both end portions of the sleeve on which the layup is wrapped may be configured as a knot or a fold.

The resinous material disposed between the fibers may be adapted to be cured by heat. The second resinous material may be adapted to be cured by heat. The second resinous material may encapsulate the foaming agent.

The second resinous material encapsulates the foaming agent and is caused to expand at about same temperature as the curing temperature for the first resinous material.

The second resinous material and the foaming agent may not be rigid in form and may be in a powdered form.

The second resinous material and the foaming agent may have an expansion ratio greater than 30, or preferably in the range of about 50-70, for example 60.

The inventive method of making a fiber composite member, comprises forming flat members of fiber permeated with resinous material, and wrapping the flat members around a mandrel. A foam plastic forming material is placed within the wrapped flat members. One then substantially closes the ends of the wrapped flat members to define a substantially closed bladder. One then introduces the closed bladder into a mold, causing the foam plastic forming material to form a foam plastic. the resinous material is then cured, for example by heat.

The cured layup is removed from the mold. Alternatively, the mold is a member which forms a permanent part of the fiber composite member.

Preferably, one covers the mandrel with a sleeve prior to wrapping the fiber layers. An adhesive material may be used to tightly secure the sleeve around the mandrel. The mandrel may be a two-part mandrel.

The fiber may be graphite fiber. The foam plastic forming material may form foam plastic when subjected to a temperature close enough to the temperature at which the resinous material cures under the application of heat so that the foam plastic exerts pressure on the layers of fiber while the resinous material is curing.

Advantageously, inner and outer tubular members may be used to form the racquet frame, with the inner tubular member extending around the head of the racquet frame.

Accordingly, it is an object of the present invention to provide a method for producing a racquet frame made from composite material, in which gas injection is not needed to expand the composite material to form the racquet frame and the frame can be completely enclosed during the manufacturing process in a closed mold.

It is another object of the present invention to provide a method for producing a racquet frame which, while being at the low end of the range of acceptable racquet weights, still has the strength necessary to play well under demanding conditions of play. This means that a single inventive racquet may be modified through substantially the full range of player weight preferences and distributions. In accordance with the invention, this can be achieved, after manufacture of the frame, and even after stringing of the frame, by installing objects which may be mounted to the frame and even incorporating weights inside the frame.

It is also possible to incorporate weights at various positions on the frame. These positions may be selected in order to optimize racquet characteristics during play. This compares to conventional racquets, where the weight of the graphite/polymer composite was often needed around the circumference of the head in order to support the strings. Moreover, structures incorporating weights, if they had been contemplated, would have presented complications in conventional manufacturing processes, insofar as there was an increased likelihood that an air passage might be blocked during manufacture in a conventional airflow manufacturing method.

It is another object of the present invention to provide a very thin solid racquet frame which reduces shock over and above a conventional hollow frame and increases performance due to swing speed and head speed, and by virtue of having a larger hitting zone or "sweet spot".

It is another object of the present invention to provide a modular racquet fully customizable in the field by ordinary consumers.

This method can greatly enhance graphite rigidity and strength to form more powerful strokes and shots in sports. It can also be expected to decrease the shock and vibration associated with tennis elbow and shoulder injury by creating a closed solid filled product. In accordance with the invention, such a structure is achieved because the opposite ends of the tube are closed and the entire tube is optionally put in a mold which is completely closed. This is in contrast to prior art manufacturing methods which include a nozzle and a cap which protrude out of the mold, and result in additional hand labor to fit the nozzle and the cap, prior to curing of the resin and sawing of the base of the frame handle after the resin has cured and solidified.

It is another object of this invention to provide a method of shaping graphite fiber members, and a manufacturing operation, including a single curing step, for manufacturing graphite fiber elements into various shapes otherwise not attainable with conventional air pressure molding. More particularly, this may be achieved because the shape of the part being manufactured need not provide for a continuous path for airflow. Instead, a number of platters may be assembled, and the assembled bladders then put together in a desired configuration for heating and curing.

It is another object of the invention to provide a method for manufacturing a graphite fiber composite member without an inner nylon bladder, relying upon the viscosity of the foaming plastic to prevent air leaks through a carbon fiber/resin layup.

It is another object of this invention to provide a method which solves the problem of inconsistent racquet characteristics due to the irregularities and other problems associated with the nozzle air injection process.

It is another object of this invention to manufacture graphite racquets by use of machines and to minimize or eliminate human labor.

Another object of the invention is to provide a framework for the production of a composite fiber resin racquet, which can be easily loaded with weights to adjust the racquet's weight and balance.

Another object of the present invention is to mold a racquet frame with holes, thus eliminating the need for drilling holes after manufacture of the frame. This may be done by assembling two half-racquet layups, placing one of the half-racquet layups in the bottom half of the mold, placing a plurality of pins, positioned where the holes belong, in slots provided in the mold, and then placing the other half-racquet layup over the first half-racquet layup and closing the mold using the other half of the mold.

In one embodiment of the invention, the racquet also uses a closed racquet handle base formation with the object of reducing injuries from shock and vibration, as compared to racquets with the open ended shaft of present state-of-the-art graphite racquets.

BRIEF DESCRIPTION THE DRAWINGS

The operation of the invention will become apparent from the following description taken in conjunction with the drawings, in which:

FIG. 1 shows a prior art graphite tennis racquet;

FIG. 2 illustrates a cross-section of tennis racquet using a rigid unencapsulated foaming plastic as described by Cecka, U.S. Pat. No. 4,129,634 in a prior attempt at using foaming agents to manufacture a carbon-graphite racquet;

FIGS. 3-5 illustrate the prevailing industry practice using air injection to form the main portion of a graphite racquet frame, as described by Hsu, U.S. Pat. No. 4,511,523 forming graphite racquets;

FIG. 6-7 illustrates the construction of a layup useful in the practice of the inventive technology;

FIGS. 8 and 9 illustate the curing of a tennis racquet using a foam plastic generating composition comprising microcapsules incorporating foaming agent sold under the trademark EXPAN-CELL 152 used in accordance with the invention;

Figure 8:
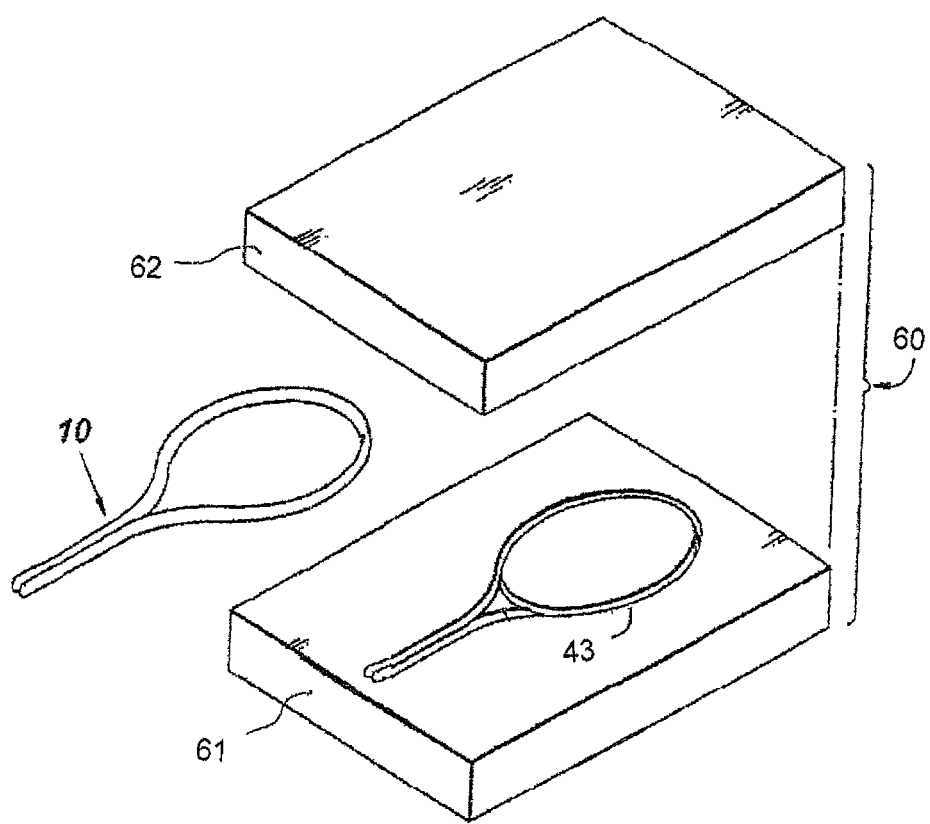
FIG. 8 is the fiber tube shaped for the formation of the racquet which can be placed in a mold by machine.
Figure 9A:
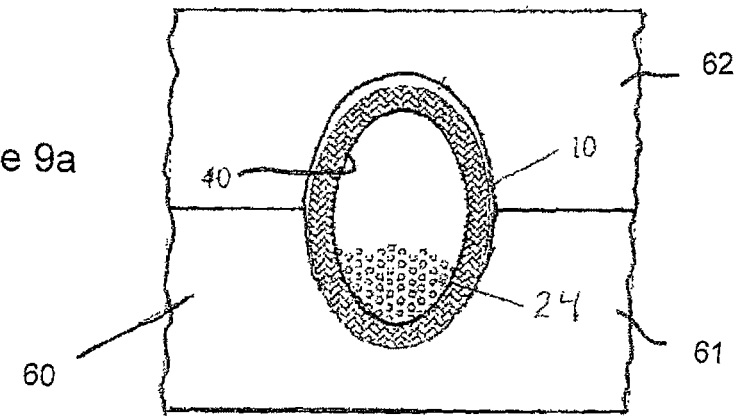
Figure 9B:
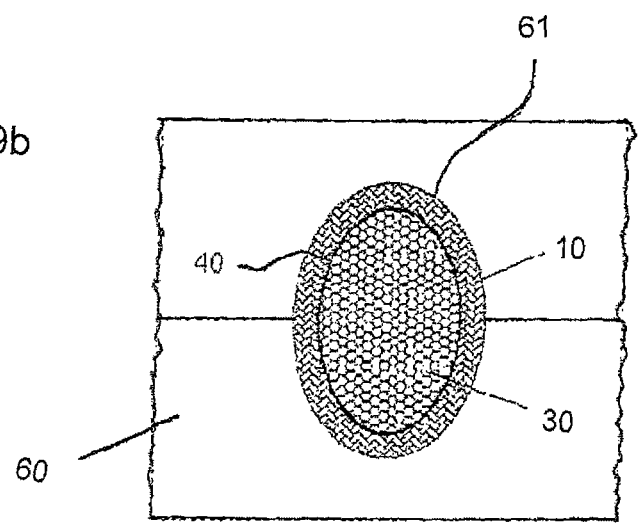
Figure 11:
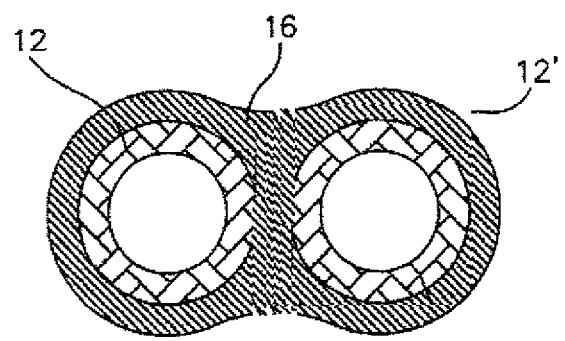
Figure 10:
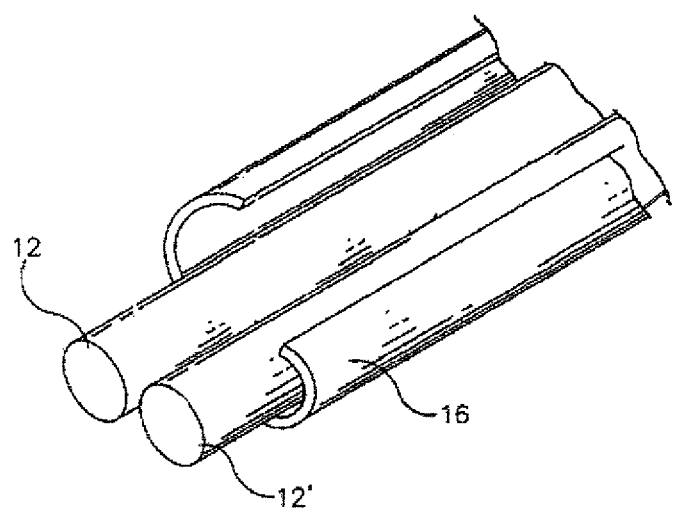
Figure 12A:
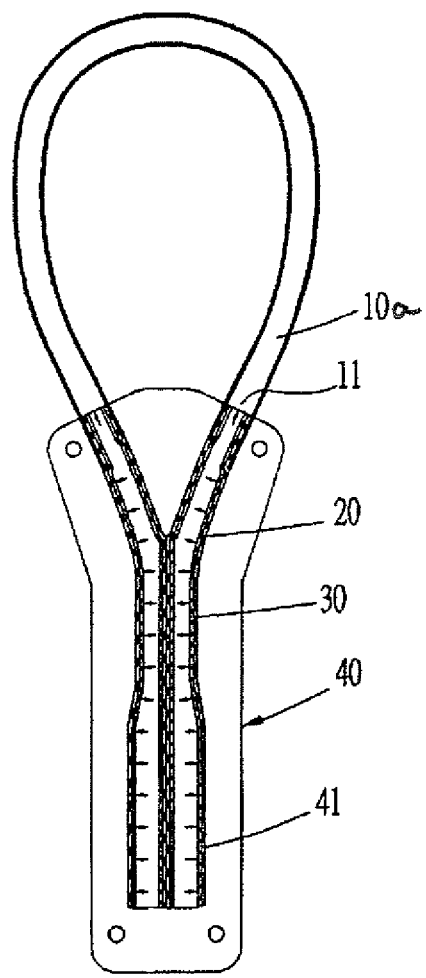
Figure 12B:
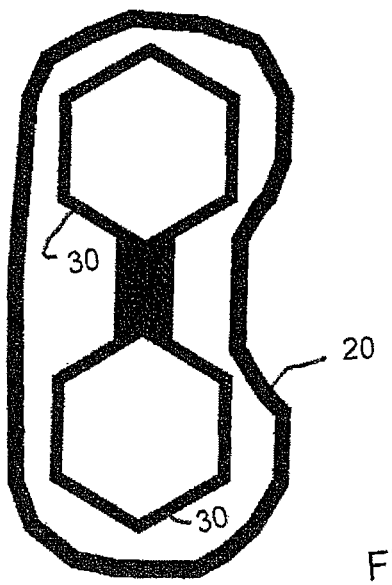
Figure 13:
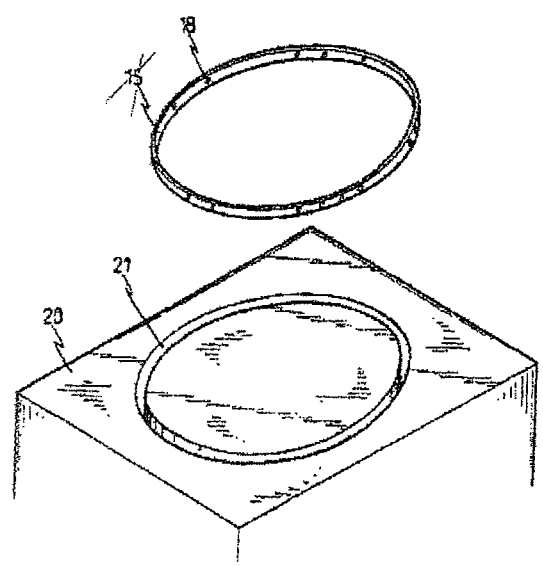
Figure 14:
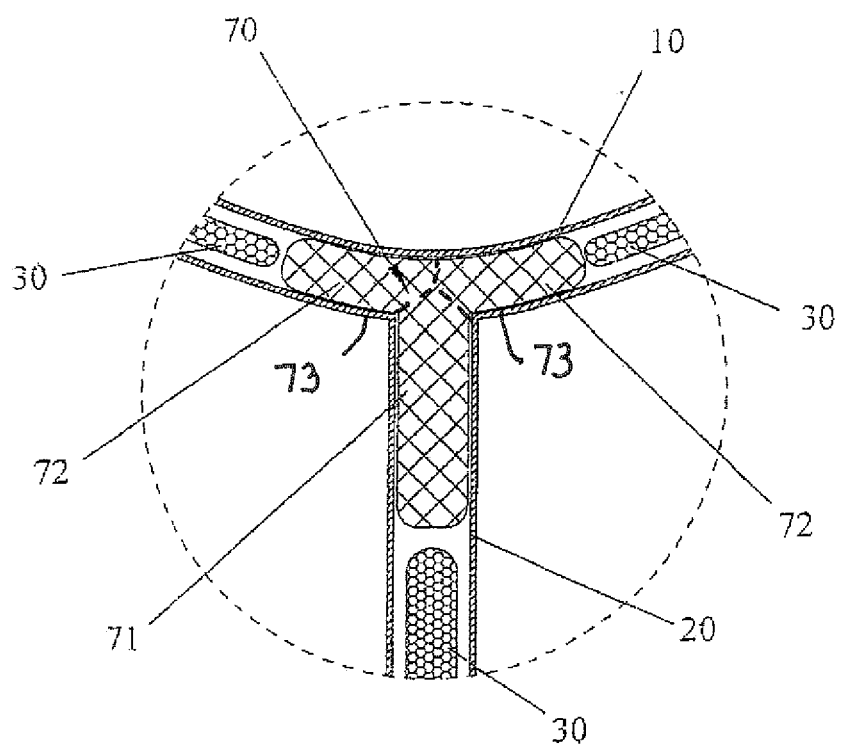
Figure 15:
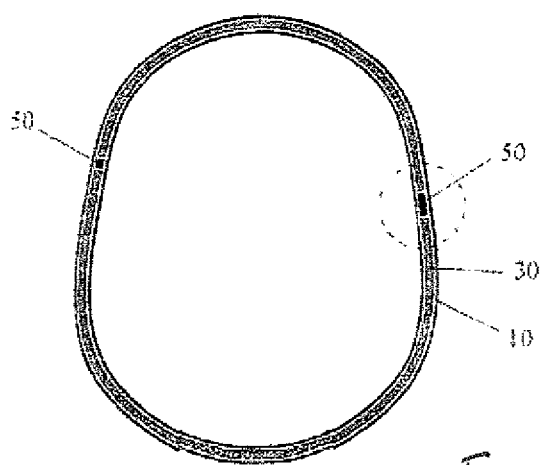
Figure 16:
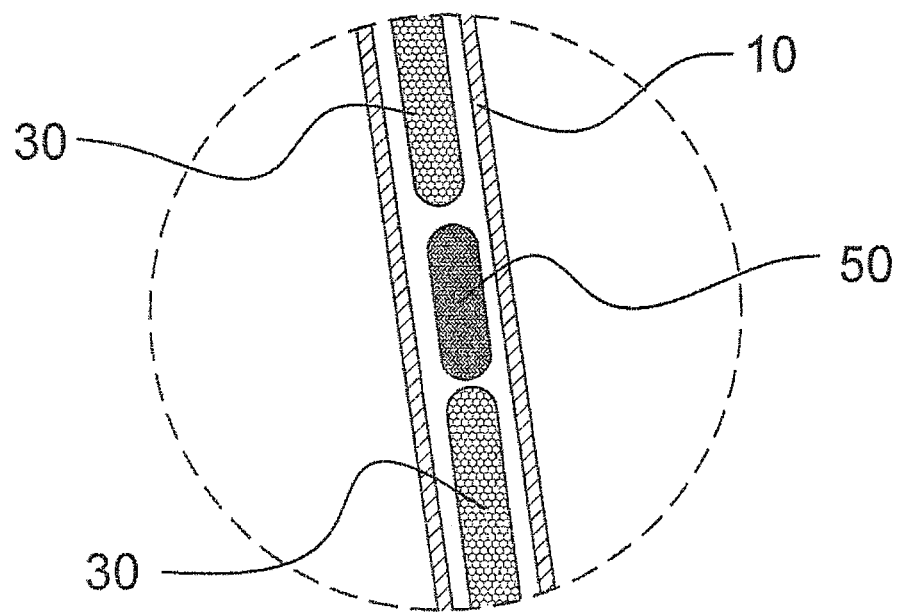
Figure 17:
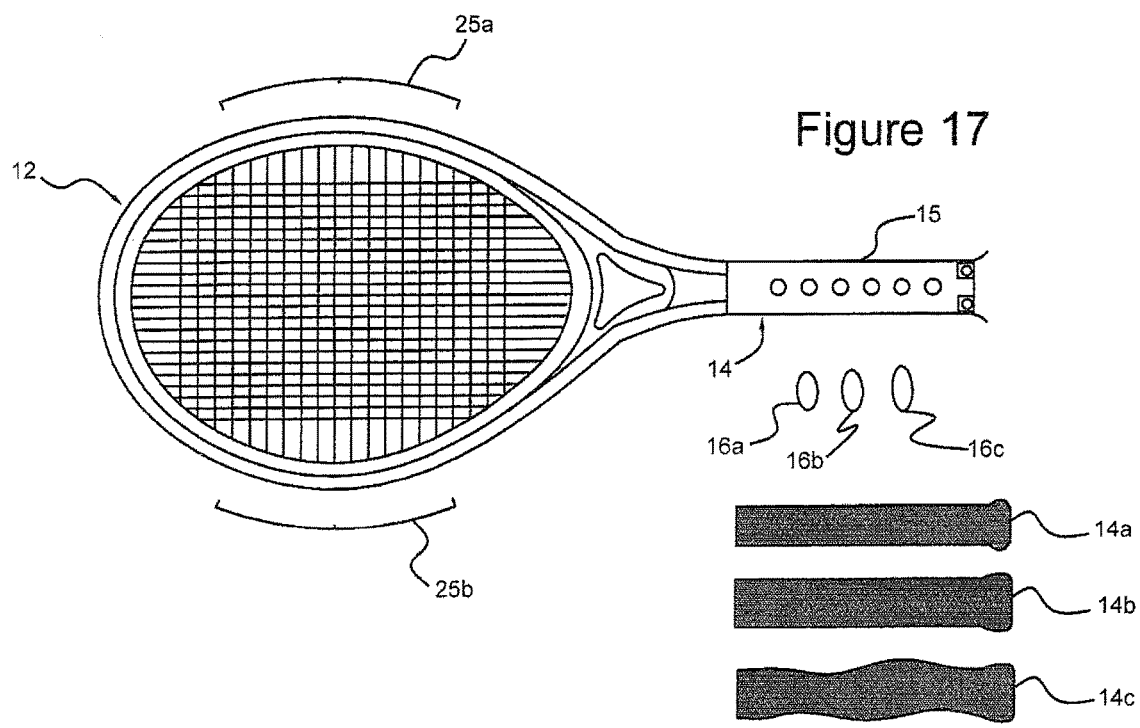
Figure 38:
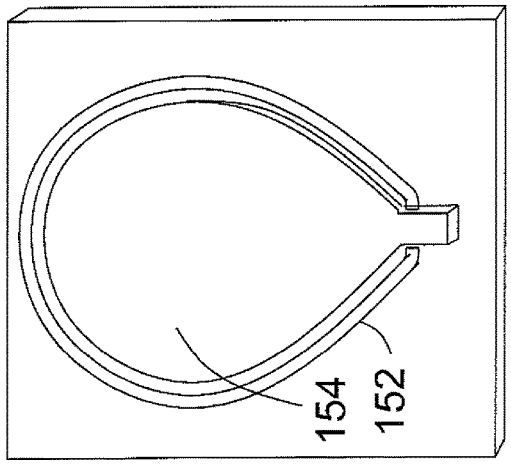
Figure 37:
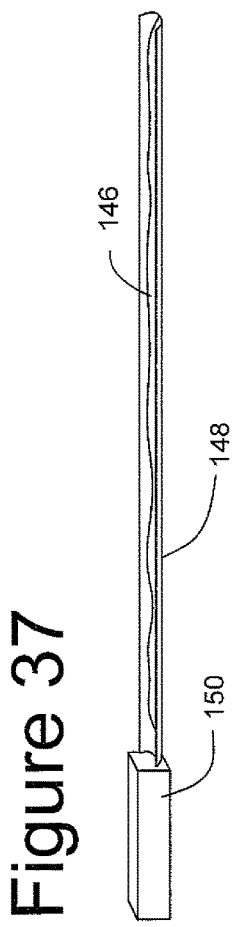
Figure 51:
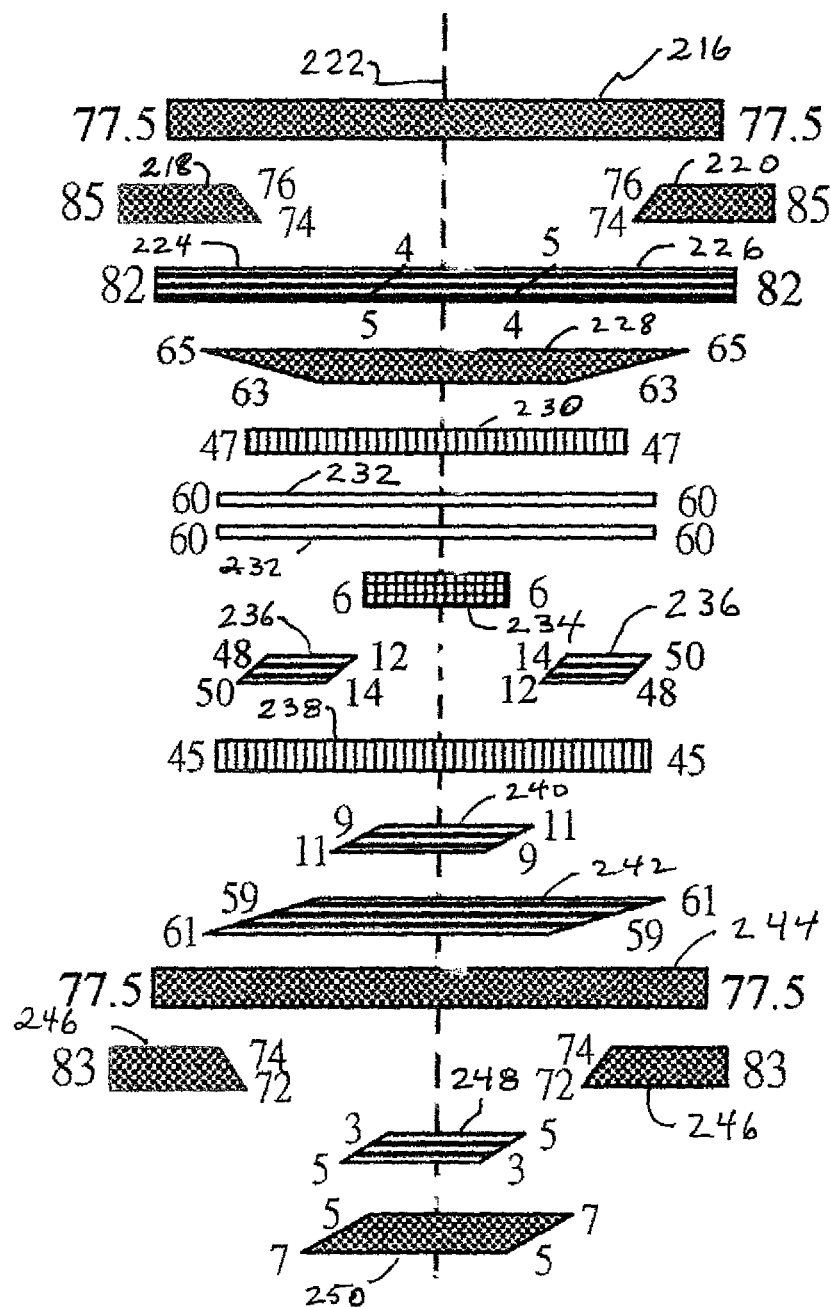
Figure 62:
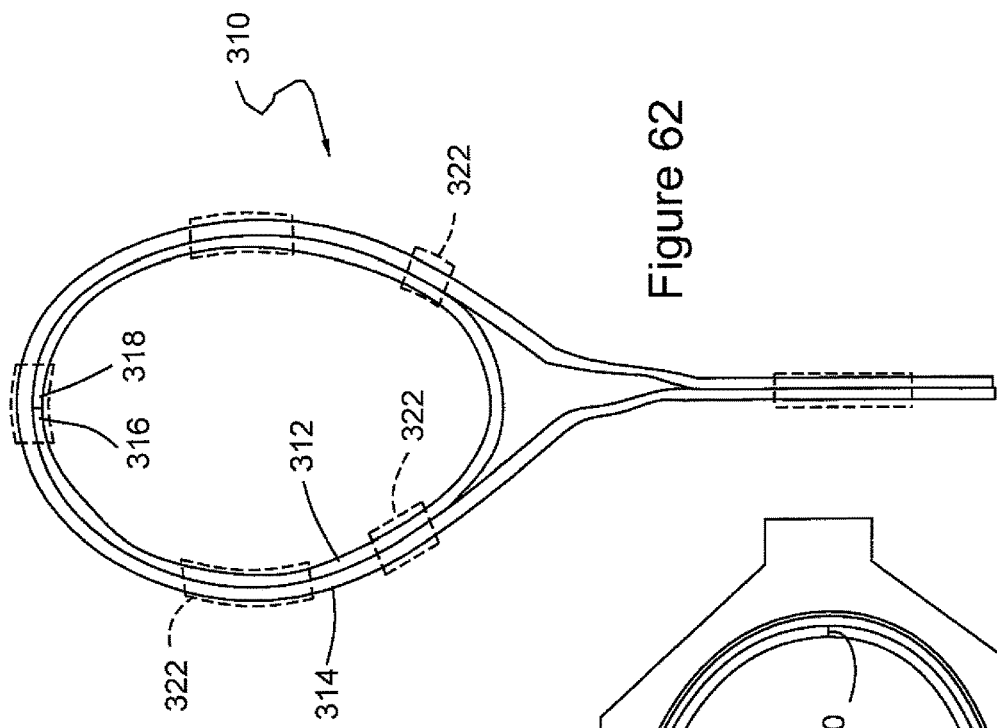
Figure 63:
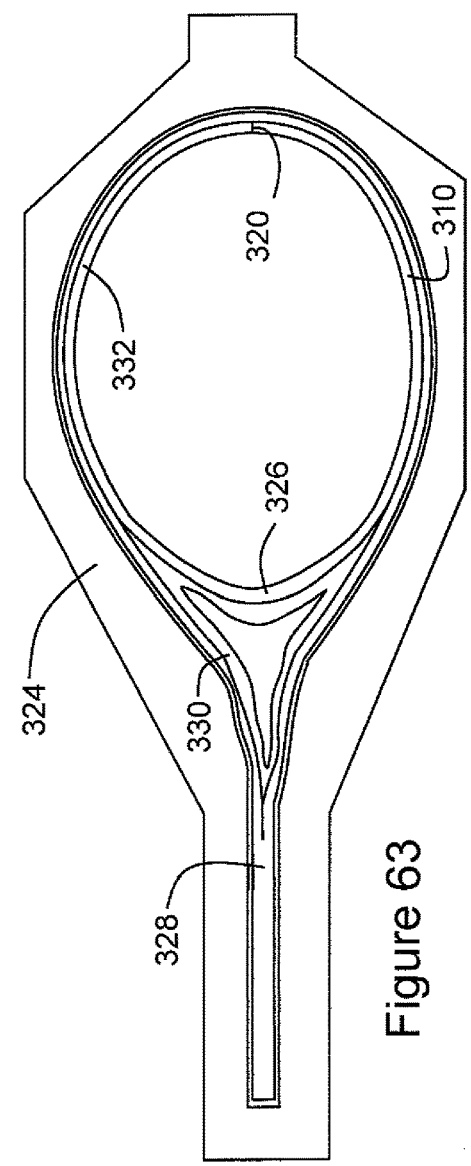

FIGS. 9a and 9b are horizontal cross-sections through the frame head of FIG. 8 showing the Expancell 152 inside the fiber tube comparing the pre thermoform (that is prior to the application of heat and the physical softening and expansion of the microencapsulated foaming agent) FIG. 9a and the post thermoform state (that is subsequent to the application of heat sufficient to cause the microcapsules to expand, under the action of the foaming agent and cause the foam to expand and force the carbon fiber to the inner walls of the mold forming the racquet) FIG. 9b;

FIG. 10 is a cross sectional view of another embodiment of the invention whereby post-thermoformed microencapsulated graphite tubes are placed within fiber tubes for the formation of tubes within tubes;

FIG. 11 is the cross section of another embodiment of the present invention, showing two tubes which have been formed prior to being wrapped with a second tube to form the string supporting hoop or head portion of a tennis racquet;

FIG. 12a illustrates molding of the handle portion of a racquet;

FIG. 12b is a cross section view of a tube within a tube structure;

FIG. 13 illustrates making a frame head;

FIG. 14 illustrates the construction of a badminton racquet;

FIGS. 15 and 16 show yet another embodiment of the invention with racquet weight distribution;

FIG. 17 shows a finished customizable racquet 14 in exploded plan view;

FIGS. 18-25 illustrate the making of carbon fiber patches for use in making the inventive frame and practicing the inventive method;

FIGS. 26-27 shows the makup of a graphite assembly used to begin the wraping of a layup for a badminton racquet;

FIG. 28 shows a two-part mandrel for wraping the inventive layup;

FIGS. 29-36 illustrate wrapping of the inventive badminton racquet;

FIG. 37 illustrates a tool for filling a layup with microcapsules;

FIG. 38 illustrates a wood mold for forming a badminton racquet head;

FIGS. 39-49 illustrate further wrapping of the inventive badminton racquet;

FIG. 50 illustrates a mold for curing of the inventive badminton racquet;

FIG. 51 illustrates the parts of the inventive tennis racquet;

FIGS. 52-54 illustrate the formation of a layup for the inventive tennis racquet;

FIGS. 55-56 illustrates alternative heat-curing molds for the formation of handles for the inventive tennis racquet;

FIGS. 57-60 illustrate completion of the formation of a layup for the inventive tennis racquet;

FIG. 61 illustrates a heat-curing mold for completion of the formation of the inventive tennis racquet;

FIG. 62 illustrates diagrammatically a layup for an alternative inventive tennis racquet; and FIG. 63 illustrates diagrammatically the molding and heat-curing of the alternative tennis racquet of FIG. 62.

DETAILED DESCRIPTION OF THE PREFERRED EMBODIMENTS

Figure 1:
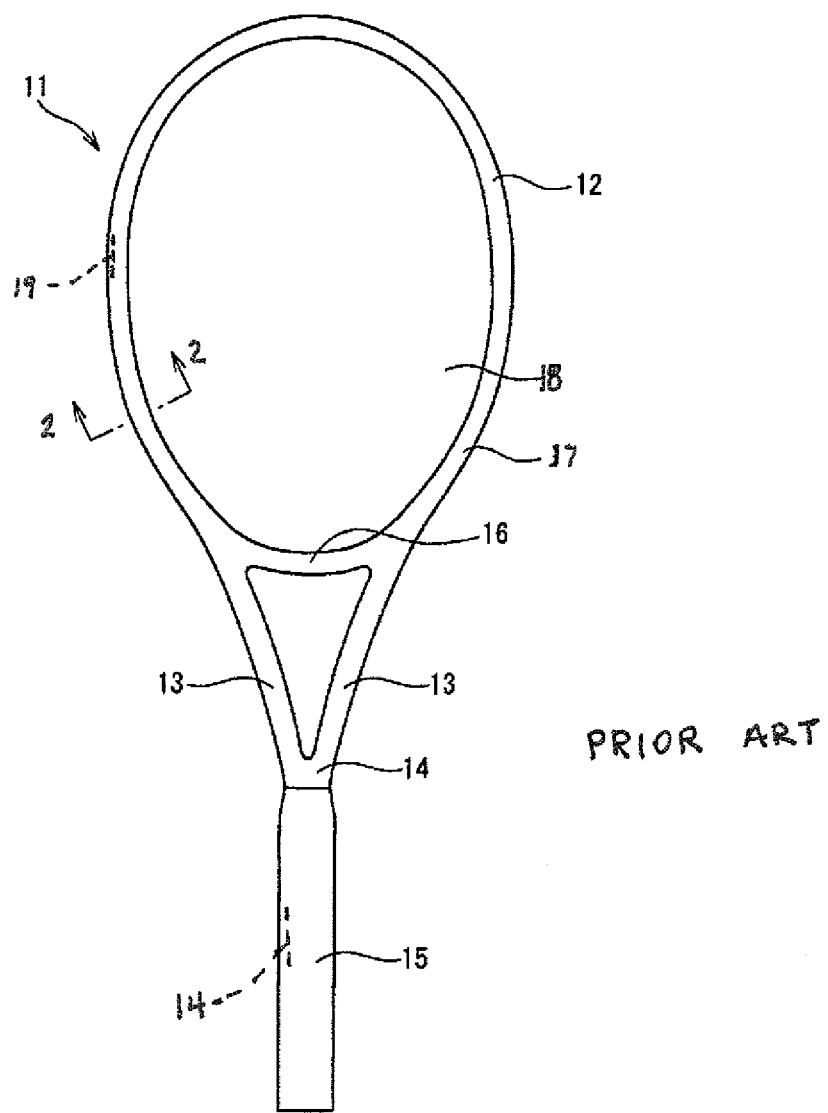

FIG. 1 shows a conventional graphite racquet frame 11 in the prevailing and desired racquet shape. When fabricated using air injection graphite manufacturing techniques, it has an advantage in strength to weight ratio over the predecessor wooden racquet. The racquet frame 11 has a head portion 12, a throat portion 13, a handle or shaft portion 14, and grips 15 which overlie handle 14. These portions of racquet frame 11 are formed as a single, integral and continuous member. Bifurcated throat portion 13 is continuous with the head portion 12 and with shaft portion 14. A crosspiece or yoke portion 16 is provided between both sides of throat portion 13. Yoke portion 16 and head portion 12 form a roughly oval string-stretching portion 17 surrounding a ball-hitting face 18. A string groove 19 is concavely formed on the outer surface of the head portion 12.

Figure 2:
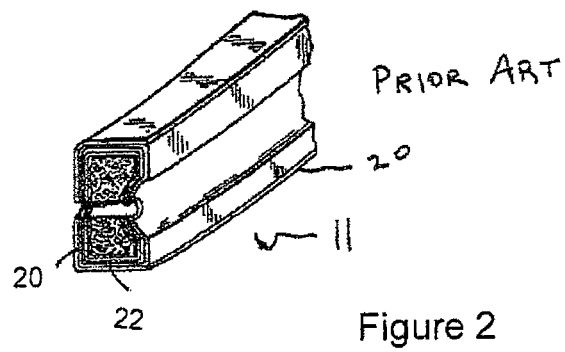

FIG. 2 illustrates a prior art tennis racquet frame structure as described in U.S. Pat. No. 4,129,634 to Cecka. Here, frame 11' includes an outer surface formed by layers of graphite fiber 20 and an inner foam core 22. This product is made by rolling multiple layers of carbon fiber over a central putty like core. The core principally comprises filler material, such as cork, resin (such as a thermosetting resin), and blowing agents to achieve foaming of the resin, as well as an accelerator and curing agent. During manufacture, the racquet layup is put in a tool steel mold and heated. The pressure generated by the blowing agent during the formation of the foam core is intended to provide pressure which conforms the outside shape of the layup, after cooling, to the shape of the mold. As alluded to above, this technology is not believed to have been commercially employed, perhaps on account of the unfavorable racquet characteristics, as the simple inclusion of a foam plastic core does not, of itself, result in improved playing characteristics as has been discovered in accordance with the invention.

In accordance with the invention, expansion of the foam plastic is timed to substantially coincide with or follow the softening of the plastic which forms the foam core of the inventive racquet. Prior to curing, the resin which saturates the graphite fibers is a sticky soft material. Accordingly, if expansion is not carefully timed, it is possible for the same to occur somewhat prior to curing and then for curing to occur, perhaps after pressure has been lost.

In accordance with the invention, the foam core may comprise an open cell or closed cell foam plastic. The material used in the preferred embodiment, Expancell® has the advantage of being somewhat liquid during formation of the foam plastic. It is also believed that closed cell foam may provide an advantage in ensuring that in the event of a leak the closed cell material may be more effective in quickly filling the leak and because of its viscosity compared to air more effective in preventing air escaping and thus pressure loss.

The curing temperature of carbon resin may be, for example, 130 degrees Celsius. The internal pressure used at 130 degrees Celsius to press the carbon layer against the mold and to adhere the sheet carbon fiber resin layers together before resin is cured should at least be from roughly around 7 kilograms/cm$^2$ (about 100 psi) to 15 kilograms/cm$^2$ (or about 215 psi), although 5 kg/cm$^2$ is sometimes employed in some applications. The foaming plastic to be selected is preferably able to reach this pressure during curing. This can most easily be achieved when foaming begins after the resin is at its curing temperature and may be cooled before the pressure is lost.

Moreover, many foams can only expand to 2-3 times in size and because of their size would cause the fiber to be clipped outside the desired mold shape. The clipping of the graphite fiber yarn would damage the construction and jeopardize the construction and strength.

It is noted that if expansion does not occur at the proper time, the racquet will still look like it is properly made. Adhesion between graphite layers and between the foam core and the graphite layer might also be good. However, adhesion between the graphite layers might not be good enough to result in excellent and/or long-term performance by the racquet frame. Thus, it is important that sufficiently high pressure be applied by the foam after the resin has been polymerized and is ready to be cooled. Of course, it is possible for such pressure to be created prior to polymerization, provided that the same is at a high enough level when polymerization occurs.

It appears that if loss of pressure after polymerization occurs, this is not critical because pressure has been applied to the graphite layers causing them to be securely bonded to each other, and loss of pressure, even while a thermoplastic frame is in the softened state may not affect frame characteristics in the cooled product.

It is further noted that the use of a powder foaming plastic material, for example an encapsulated foam, allows the layup to be pressed flat to prevent the clipping of the graphite in the mold when the mold is closed before the resin saturating the carbon fiber is heated and cured. Expansion which is too slow can also create pitching of the fibers by the mold outside the mold cavity.

Using foam type materials to pressurize and mold the graphite can fail because the layer lamination pressure is not high enough and because of the low carbon fiber expansion rate. If the foaming material density is too high, even though the expansion rate reaches the required level, it will not be as lightweight as is desired for carbon fiber reinforced products.

Figure 4:
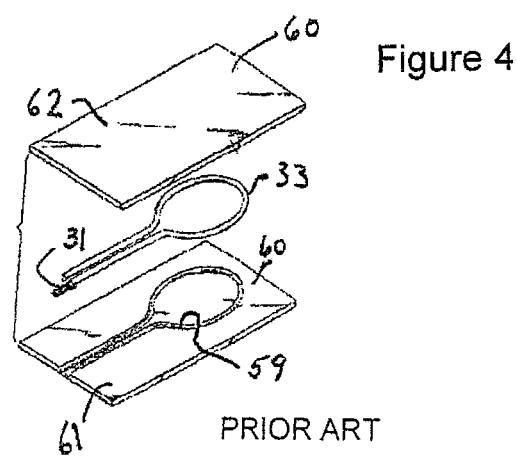
Figure 3:
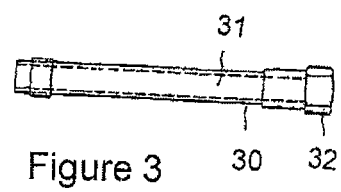
Figure 5:
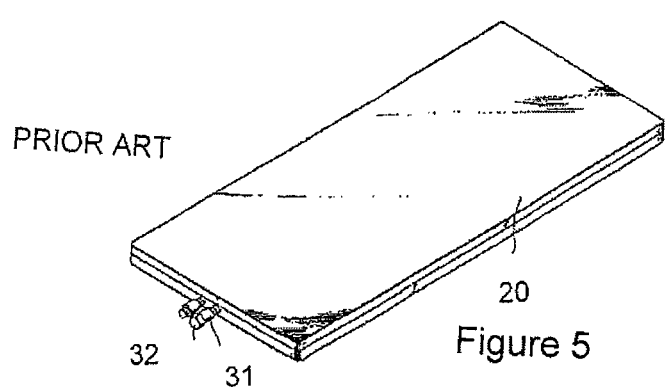

FIGS. 3-5 show the prevailing air pressure racquet making technology used today. The carbon fiber used to make the layup takes the form of a graphite sheet. Graphite sheets are wrapped around a seamless sleeve to produce the layup.

Air pressure is forced through an inflation assembly 31, comprising a valve 30 coupled by nozzle 32 for receiving a source of air pressure, as shown in FIG. 3. Inflation assembly 31 is coupled at one end to a source of compressed air and to the sleeveless tube of the layup 33 at the other end. Layup 33, formed of an inner tubular member and layers of graphite material impregnated with resin, is placed in the cavity 59 defined by mold halves 61 and 62 of mold 60 for heating and curing of the layup, under the application of air pressure, in order ultimately to form the molded and cured frame. See FIG. 4.

The prefabricated soft carbon tube layup 33, formed of carbon fiber and uncured resin, is placed into cavity 59 defined between steel mold halves 61 and 62 of mold 60 when the clamshell is closed. Air nozzle 31 is coupled by its female nozzle coupling 32 to a source of compressed air, which may be sealed by a mating male nozzle.

The finished layup is placed in a bottom mold section 61 and then covered by the upper mold section 62. See FIG. 5.

The nozzle is attached to one end of the seamless sleeve to create the necessary air pressure inside the sleeve to form the carbon to the mold cavity 59 at the curing temperature, which is typically around 130 degrees Celsius. The other end of the seamless sleeve may be sealed, or one may rely on air rushing through one end while it is in the mold to blow up and seal the opposite end of the seamless sleeve by bringing the two ends of the sleeve together in a single tubular portion of the mold.

After the graphite composite has been cured, it is allowed to cool. Next, finishing of the racquet including removal of excess material, sanding and removal of the base of the handle or shaft of the racquet, for example by sawing, is performed.

From this it will be understood that the bottom of the shaft is open and hollow. Moreover, in order to implement conventional manufacturing methods, this is necessary in order for air to be injected into the carbon tube while heated. The resulting racquet will accordingly have an open ended shaft as a result of this process.

In the preferred embodiment, a material understood to comprise plastic hollow microspheres is used to form the foam plastic. The microspheres are spherically formed particles with a thermoplastic shell encapsulating a gas. When the microspheres are heated the thermoplastic shell softens and the gas increases its pressure, resulting in an expansion of the spheres. The microspheres or microcapsules including the foaming agent are about 10-30 microns in diameter, with a thickness of 5-15 microns and density of 1.03 g per cubic centimeter.

In accordance with the preferred embodiment, curing temperature for the resin is about 140-150 degrees Centigrade. The racquet frame or other composite part should be held at this temperature for about 20 to 35 minutes.

The expansion ratio of the foam plastic foaming material selected in accordance with the invention (Expancel 152) is believed to be about sixty to one. In accordance with the invention, microcapsule foam forming material used starts to expand from around 105-115 degrees Centigrade and higher. It can continue to expand significantly until the temperature drops to under around 105 degrees Centigrade. However, the above temperature may vary depending on the particular foaming plastic product used. Significant factors in this may be the resin used, the foaming agent, and the nature of the microcapsule.

Thus, the microcapsules substantially do not begin to expand until the temperature is close to the temperature needed to cure and fuse the graphite fiber composite material. The shell of the capsule is understood to be made of an acrylic copolymer resin. The shell material, after expansion, can form the material of the final foam core of the graphite racquet. Alternatively, additional materials, such as graphite whiskers may be incorporated in powder form and mixed with the microcapsule powder to achieve different characteristics. The foaming agent may be pentane or any other foaming agent suitable for the material of which the microcapsule is made and for the application, for example tennis racquet frames.

In accordance with the invention, the particular foam plastic material which is deposited in the layup is Expancel 152, available commercially from Akzo Noble. A predetermined quantity of the Expancel 152 is placed into the seamless tube and the layup is rolled to more evenly distribute that material.

Opposite ends of the filled layup are sealed, for example by tying the ends of the seamless tube on which the resin-impregnated carbon fiber strips are wrapped. The filled layup is then formed roughly in the shape of the product being made, for example a tennis racquet, and placed in the mold cavity in the bottom of the mold. The top of the mold has a similar or substantially identical cavity, and the layup is carefully fitted to be contained in the cavity, and to avoid pinching of the layup by surfaces of the mold adjacent to cavity.

The mold is then heated. Once the desired temperature is reached, as understood, the microcapsules will soften and the foaming agent associated with the Expancel 152 expands in size. When cooled, the expanded microcapsules, which now form a foam plastic core, will substantially hold their volume.

Thus, in accordance with the invention, it is simply necessary to put powdered polymeric beads containing the foaming agent in the layup and follow the process steps of sealing the layup, putting the layup in the mold and heating to the desired temperature.

It is also noted that the invention will work with microspheres which maintain their physical sealed characteristic after heating, as well as microspheres which open, fracture or physically break down or deteriorate when they are heated.

In principle, it may be possible to add other polymeric materials, for example, fine plastic powder, or other suitable material, to the Expancell 152 to vary the characteristics of the foam filling the inside of the finished racquet.

Figure 6:
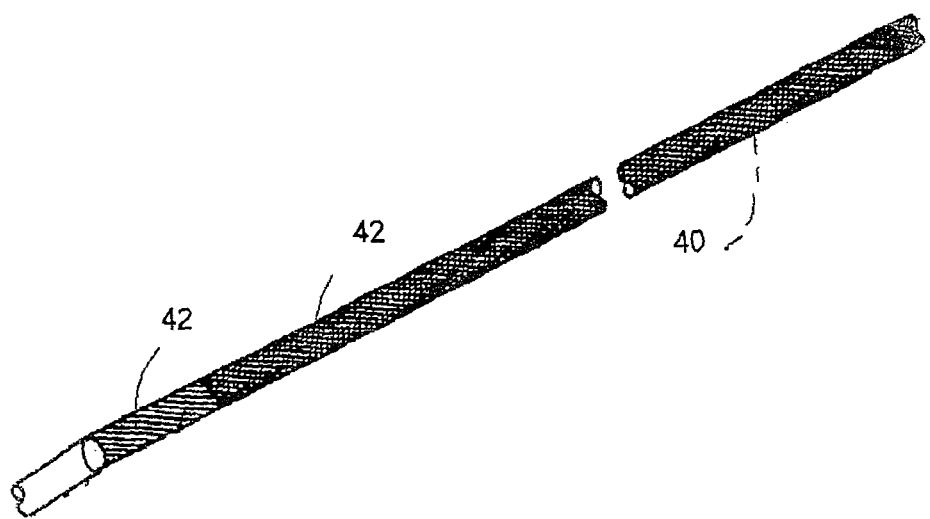
FIG. 6 is a perspective view of a closed cellophone tube containing the microcapsulated foaming agent which can be made by machine.

This can be seen more clearly with reference to FIG. 6, where a tubular seamless sleeve 40, covered with carbon fiber layers 42 and 44, filled with microcapsules 21 of EXPAN-CELL-152 is illustrated. Sleeve 40 is closed, for example, by knotting the ends of the seamless sleeve closed, or as an alternative this may be achieved using a machine process, such as the application of staples or clamps, or by heat sealing, as opposed to using hand labor.

Figure 7:
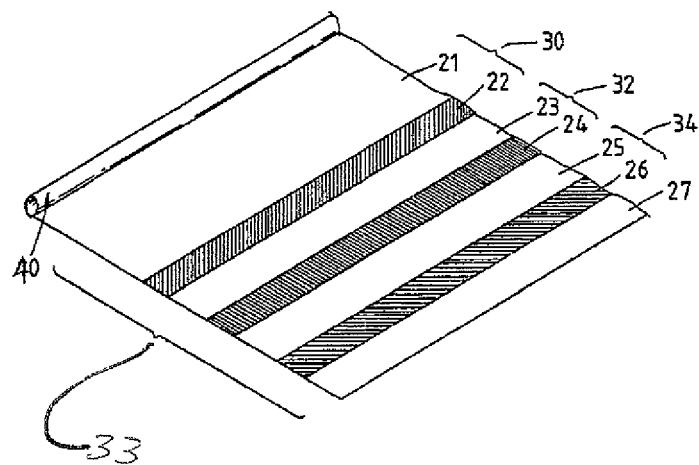
FIG. 7 is a closed tubular shell formed from a cellophane tube containing the microencapsulated foaming agent in cell 152, with the tube wrapped with a closed multi-ply sheet of resin impregnated fiber forming a tube in accordance to with the present invention which may be formed by machine rather than human labor.

FIG. 7 shows, in schematic form, the soft, for example graphite, fiber wrap to make the fiber wrapped layup tube 33. It is formed from an open-ended, for example clear, tubular seamless sleeve shell 40 wrapped with a multi-ply sheet of a resin impregnated carbon fibers. In principle, fiberglass or graphite fibers permeated with the resin may be used. The layers, for example six different layers of fiber 21-27, can be of different fibers (or the same fiber). For example, layers 22, 24, and 26 may have different characteristics and/or different resins, and/or different orientations. These layers form the soft unheated carbon tube layup 33.

As shown in FIG. 8, the closed finished soft fiber tubular layup 33, containing microcapsules in core sleeve 40, is fitted into the recess 43 in bottom mold section 61. Core sleeve 40 is also sealed at both ends. Sleeve 40 is curved to the general shape of a racquet to be placed into recess 43 in mold bottom section 61 of mold 60. This can be done manually or by machine.

Importantly, as shown in FIG. 9*a*, prior to the thermoforming, processing of layup 33 requires that an appropriate amount of the microcapsules 21 be contained in the finished tube 10. Preferably an interlayer film or core sleeve 40 is positioned between the first fiber layer in layup 33 and microcapsules 21. Core sleeve 40 functions to effectively prevent the microcapsules 21, after being expanded by the application of heat to form foam plastic 30 (FIG. 9*b*), from leaking during heating of the mold and solidification of the fiber. It also maintains the air pressure and prevents overflow which could affect the quality of the finished product. A preferred embodiment of the invention uses EXPAN-CELL-152 A, a micro encapsulated foaming plastic, which is processed at a moderate temperature. It is also believed that obtaining a substantially uniform distribution of the EXPAN-CELL-152 throughout the length of the tube by, for example, rolling and tilting the tube will achieve superior results.

As noted above, layup 33 may be made of flat planar graphite composite material and may be closed. This may be done by twisting and knotting the end of core sleeve 40, or by simply folding and compressing the ends of the tube mechanically. Alternatively a mechanical device like a small clip may be used. The clip is made of material, for example plastic incorporating graphite fiber, which melts and becomes part of the final racquet. Alternatively, adhesive may be used in a relatively small amount, such as plastic which has been softened into a dope through the use of a solvent, for example acetone. If desired the dope may be formed using a material which dissolves the plastic of which the dope is made, but which does not dissolve the thermoplastic/graphite fiber composite. Still yet another alternative is to use a solvent for the thermoplastic material in which the graphite fiber may be contained.

There are a number of methods to dispense the microcapsules in the finished filled fiber tube 10. For example, clear plastic tubes with microcapsules inside are premade and then pulled into the layup. Alternatively, the pre-filled tubes may be wrapped by the fiber to form the finished fiber tube 10. A second method is to pour, inject, or dispose the microcapsules into the fiber tube after they are rolled using an auxiliary rod or mandrel which can be slid out of the fiber tube. Third, fiber tubes containing microcapsules using these methods can be used to create second and third filled tubes within tubes, within tubes, and so on.

The mold is heated over time where the mold temperature cures the carbon fibers solidifying at a temperature of 130 degrees C. The curing time is optimally between 20 minutes and 35 minutes. The microcapsules 21 do not expand to form foam plastic 30 until the heat is stabilized at the same temperature as that needed to solidify the fibers with the resin. Its curing in the heating process, as shown in FIGS. 9*a-b*, results in the thermal expansion of the microcapsules, creating the internal pressure from inside the fiber tube to bulge against the mold cavity wall. Generally, the instructions of the manufacturer of the microcapsules should be observed.

In accordance with the invention, when the microcapsules are heated to the proper temperature, they begin to expand because the shells of the microcapsules become plastic. The microcapsules forming the core plastic continue to expand resulting in their applying pressure to core sleeve 40 which, in turn, applies pressure to the graphite material. At the same time, the heat that was applied to the mold and thus applied to the microcapsules, is also heating the graphite/polymeric resin sheets which are also caused to cure. As the microcapsules expand, they may stretch the sleeve 40 and carbon fiber polymeric sheet tube to the point where it is driven against the inner walls of the mold, forcing it into the shape of the mold, and also forcing the layers of carbon fiber material against each other. Because the plastic is cured, the layers fuse to each other and the multiple layers become a single thick structure.

FIGS. 10 and 11 show a second embodiment, where fiber tubes are placed within microencapsulated filled tubes and heated to solidify the multiple tubes for additional strength and rigidity in the racquet.

It is noted that the formation of two tubes, the filling of the tubes 12 and 12' with foam plastic and microencapsulated foaming agent and the wrapping of the two tubes with a third tube 16 may be done prior to the application of heat to cause the plastic to foam.

Alternatively, microencapsulated foam material may be included in two different forms to form the foam plastic. The individual tubes being formed as described above (optionally over first and second tubular sleeves), the resultant handle of the tennis racquet is wrapped with a second layer 16 of thermoplastic carbon fiber sheeting as described above (optionally over a third tubular sleeve), and then the assembly heated a second time to a lower temperature. At the high temperature of the first racquet formation step, microcapsules designed to foam at that high temperature are used. The other microcapsules foam at the lower temperature thus allowing a second application of heat and pressure in the formation of the tennis racquet.

It is also noted that it is possible to form the entire tennis racquet with double tubes, thus resulting in an internal structure formed of two tubes, generally having a closed form, for example, with a planar wall dividing it in half and giving it particular strengths.

In accordance with the invention, it is contemplated that the planar wall may be perpendicular to the plane of the racquet, as illustrated in FIG. 11. However, the planar wall may be parallel to the plane of the racquet, depending upon the playing characteristics which one desires. In connection with this, it is noted that the invention may be used in connection with products other than sports racquets, such as bicycles, where different configurations of the divider wall which extends along the length of the tube may be desired for different parts of the bicycle. In still other items of sports equipment, for example baseball bats, it may be useful to have multiple divider walls extending both perpendicular to each other, and this may be achieved using four individual tubular sections.

In accordance with the invention, it may also be desirable to include more than four layups in a single structural member.

Still another alternative is for a tube, which wraps two other tubes, to be filled with the other two tubes and to have plastic and microencapsulated foaming agent positioned between the outsides of the two inner tubes and the inside wall of the outer tube, and for the entire assembly to be heated to cause the microcapsules to foam and cause the formation of pressure and foam plastic. In accordance with this alternative, the microcapsules filled with foaming agent, which are placed between the outsides of the already formed two inner tubes and the insides of the overwrapping outer tube, are such that foaming is caused to occur at a lower temperature, and the material which forms the foam becoming plastic at a lower temperature, so that the heat is never high enough to remelt the plastic formed during the first part of the manufacturing operation.

Finally, the foaming may be done for both the foam inside the two smaller tubes and the foam inside the overwrapping tube at the same time.

Fiber tubes 12 and 12' may be rolled manually or by machine. Then another filled fiber tube 16 is created. Finally, the microcapsules are disposed into both fiber tubes, so as to have a tube within a tube or complete a group of tubes in the prefabrication process. This auxiliary tube system allows for the formation of multiple walls within one outer tube.

The implementation of such a two step process or group of fiber tubes may substantially increase strength and performance of many finished products due to additional support within the finished graphite composite part.

It should be understood that such multiple tubes are but one optional example of the invention. It is to be understood that invention may also be embodied in single tube structures, or hybrid structures with multiple and single tube portions such as the tennis racquet of the above example. Moreover, multiple tube and or hybrid structures may be of particular importance in relatively high demand applications, such as bicycle frames, automobile body parts and the like. More particularly, in accordance with the invention it is contemplated that graphite fiber composite members may be made, not only in a two-dimensional configurations, such as tennis racquets and bicycle frames, but also in configurations where the axes of the constituent elements extend in three dimensions, for example a chair, an automobile cabin, or a lawn tractor frame.

As is apparent from the above, the multiple tube process also allows the further formation of a wide variety of shapes, even without the use of molds because they premade outer tube, for example, they graphite fiber composite tube, which may or may not be made using a mold, acts as a cavity wall in lieu of the mold. It can be processed using conveyor belts to carry it into a furnace to heat cure rather than using molds. This may result in a higher manufacturing efficiency and lower operational costs. In connection with this embodiment, it is understood that the initial set of the tubes or other mold forms into which the layup is introduced need not be as strong as a conventional iron mold, but merely strong enough to contain the pressure necessary to result in well formed high-strength graphite composite in accordance with the present invention. This embodiment can also be produced solely by machines with minimal or no human labor.

FIG. 12*a* shows a mold 40 into which the handle portion 41 of a racquet 10*a* is placed for further curing, through the formation of a second handle reinforcement member 30 within void space 11 defined by frame 20.

FIG. 12*b* shows in cross section another example of a tube 30 structure within a tube 20.

FIG. 13 shows an example of a mold 60 defining a cavity 21 for making a head 18 separately for use in a second molding into a frame.

FIG. 14 illustrates the construction of a badminton racket including a head portion 10, foam plastic pressurizing material 30, and T-shaped support member 72 for receiving the ends 73 of head portion 10. Central support member 71, of T-shaped support member 72, is received within a handle member 20. Handle member 20 and head portion 10, including their ends, are defined by carbon fiber layups and are securely disposed around T-shaped support member 72.

FIGS. 15 and 16 show yet another embodiment of the invention where racquet weight distribution is required. Racquet weight distribution balance weights 50 can be added into the layout which becomes the fiber composite tube 10 prior to the solidification and curing process that attends the application of heat to microcapsules 30. This would be difficult or impossible with conventional air injection technology because the weights might block the coupling of pressure to parts of the racquet. The weights can be made from a variety of materials including rubber, silicone, plastic, metal or any other materials and substances.

In accordance with the invention, the amount of foaming plastic material is selected so that it will fill the desired volume and provide the desired degree of pressure. Other factors are the amount of weight which the foam will contribute to the structure, and the structural characteristic of the overall part after the foam core has been formed. Multiple tubes may have substantially equal volumes, assuming that heating, mold volume and the amount of foam plastic microcapsules introduced is uniform. As the mold cavity is uniformly heated, the mold can be expected to heat the layup uniformly.

The necessity of weights and balances in racquets are well known in the industry. Conventionally, however, these weights could only be added after the solidification of the graphite fiber composite. The third embodiment allows weights to be added in the racquet head itself during the manufacturing process, for example by placement within sleeve 40 (FIG. 6), or placement within the mold cavity. Alternatively, during the manufacturing process, be incorporated for the receipt of weights. The advantage of doing this during the manufacturing process is the consistency and ease with which structural weight can be added during mass machine production to, for example, balance the racquet head, and the ease with which the same may be customized after production.

This embodiment also allows the formation of multiple structures impossible with conventional technology because air would not be able to pass through objects within the tube.

FIG. 17 shows a finished customizable racquet 14 in exploded plan view, including handle portion 15, headweights strip 25*a* and 25*b*, which can hold weights, handle portion 14*a*, and handle weights 16*a*, 16*b*, and 16*c*. Alternative handle portions 14*b*, and 14*c* are illustrated. Handle weights 16*a*, 16*b*, and 16*c* may be 2 g, 5 g, and 10 g, respectively. Buttcaps 5*b* and 5*c* are customizable and interchangeable.

Racquet 12, with interchangeable handles in different shapes and sizes 14, different weights 16, different buttcap designs 5 and different headweights 25, allows the user to create the desired weight and balance and customization points with precision.

The main concept of the method of the present invention is primarily to use the force of the foaming plastic, for example a microencapsulated foaming plastic, such as Expancell 152, to create high-pressure inside the fiber tubes of the layup to form the layup into a thermally cured shape conforming to the mold cavity wall, replacing the traditional method of using compressed air. The system of the invention has numerous advantages. First, the production method of this invention with the heat-curing and foaming processes in one step, simplify the production process, thus greatly enhancing the efficiency of manufacturing operations.

Second, the production method of the present invention, the employment of the pressure of foaming plastic such as is produced by the microcapsules avoids the air leaks and imprecise manufacturing parameters when using forced air. This has the effect of therefore reducing the manufacturing defect rate.

Third, the method of the present invention also provides for the possibility of weights installed to provide a completely new installation method, which does not require drilling, and can be equipped with weights directly to the internal frame mounted on , for example, that head.

The present invention allows the more fully automated manufacture of racquets because there is no air pipe that must be fitted by hand. The invention comprises a series of manufacturing steps, none of which requires human labor, including a) filling a sleeve with microcapsules, b) saturating the graphite fiber with resin, c) rolling the graphite around the sleeve, d) bending the graphite fiber lay up into the desired shape, e) putting the bent layup into a mould, f) heating the mould, g) cooling the mould, and h) opening the mold and taking out the finished racquet frame.

In accordance with the invention, one may optionally form the holes for the string during the molding of the racquet frame. The holes may be obtained by forming them on the head of the racquet. Alternatively, a pair of layup halves may be used to form the head portion of the racquet frame, and the holes may be formed between the halves by metal posts which extend across the mold cavity and are supported in slots provided in one or both mold halves.

Turning next to FIG. 18, the manufacture, in accordance with the invention, of a graphite composite member, for example a sports racquet frame, such as a badminton racquet frame, may be seen in greater detail. More particularly, a sports racquet may be manufactured by first manufacturing graphite fabric using Toray's Torayca brand graphite fiber which comes in a number of different varieties. It is believed that Torayca T1000GB, which incorporates 12,000 graphite filaments in a flat ribbon of axially aligned fibers, is preferable for a tennis or badminton racquet frame because of the stiffness of the frame created using this material. However, one may also use Torayca T700SC if a more flexible characteristic in the finished racquet is desired. In the case of both of these products, the graphite takes the form of a ribbon which may be pulled apart transversely to reveal the thousands of fibers which have been brought together in the form of a ribbon to enable the facile handling thereof by processing machinery, such as in the process described below.

Graphite fiber ribbon 100, which comprises Torayca T1000GB, is unwound from a spool 102 and directed by rotatably mounted bar 104 into a vat 106. Vat 106 contains a quantity of liquid resin 108. Upon the application of sufficient heat, resin 108 is of the type which will harden and cure. In accordance with the preferred embodiment of the invention, liquid resin 108 is a heat cured epoxy resin sold under catalog number WH-2370 A by the Wah Hong Industrial Corporation of Kaoh Siung, Taiwan. Fiber ribbon 100 is diverted into liquid resin 108 by a rotatably mounted bar 110. The passage of ribbon 100 through liquid resin 108 is done at the rate of about one to two meters per second and results in the liquid resin permeating the spaces between the fibers which make up graphite fiber ribbon 100.

The permeated ribbon is then fed around the rotatably mounted bar 112. Permeated ribbon 114 is then wound over a release paper layer 116 secured to the surface of a rotatably mounted drum 118. In accordance with the preferred embodiment, ribbon 114 wound on drum 118 to form coils 120 which slightly overlap each other.

As in the case of prior art tennis racquet manufacturer, the graphite fibers which comprise the racquet are oriented in varying directions. Accordingly, the coils 120 which take a generally cylindrical configuration may be cut at different angles, for example along a line perpendicular to a tangent which is oriented perpendicular to the axis of drum 118. The cutting along such a line may be facilitated by a groove on the drum oriented in the proper direction, as discussed above, with a groove configured to receive the tip of a blade for cutting the graphite fiber. The various angles are selected to enable the facile assembly of multiple layers of the planar material formed by coils 120. For example, if it were desired to make a three ply graphite planar member for use in the assembly of a layup, with one layer of fibers oriented horizontally and the other two layers of fibers oriented at ±19°, a second groove suitably oriented on the outside surface of drum 118 may be used to facilitate cutting of the fibers with the desired 19° orientation.

In order to make a two ply graphite fiber planar member with each ply having a different orientation, it is merely necessary to take one graphite planar member, manufactured using the above process, with its backing sheet 116 and exposed graphite fiber layer 120, and place it over the exposed graphite fiber resting on another release member at the suitable orientation. Working with the graphite permeated with resin and supported on a single release sheet and then removing the release sheet is preferred for ease of handling. Of course, two planar graphite members with the same orientation may be placed at the desired angle with respect to each other and cut as desired. If a three ply layer is desired, one of the backing sheets 116 may be removed and another graphite planar member positioned over the two ply assembly with the exposed graphite fiber layer 120 in contact with the graphite fiber layer 120 of the assembly.

It is noted that it is standard practice in the manufacture of graphite racquets to orient multiple layers in different directions to give strength to the finished frame structure. The invention may be applied to any prior art graphite assembly structure, retaining the orientations, lengths, widths, and so forth to achieve a racquet with superior playing characteristics. However, the technology and processes of the invention also enable the fabricator to reduce the cross-section, thus limiting the effect of wind resistance and lightning the racquet. The width of the elements forming the hoop of the racquet frame may be narrowed to result in between 2 mm and 5 mm less thickness and/or width in the cross-section of the hoop portion of the frame (in the case of a tennis racquet), while still retaining sufficient strength to string the racquet at high tension.

A multilayer graphite fiber construction 122 is illustrated in FIG. 19. If desired, it can be oriented as illustrated in FIG. 20 to cut a strip 124, as illustrated in FIG. 21. Likewise, the fibers may be oriented at a relatively acute angle to each other as illustrated in FIG. 22, allowing the fabrication of a strip from such material as illustrated in FIG. 23.

A badminton racquet may be constructed in accordance with the invention using the process described below. Generally, the size and fiber orientation of the various strips of graphite fabric permeated with resin which are used in accordance with the invention to manufacture a graphite composite frame, are the same as those used in the manufacture of a conventional graphite frame, except that the width of the same may be reduced, because the thickness of the racquet measured vertical to the plane of the head of the racquet, may be reduced by, for example, two or three millimeters, while obtaining at least sufficient strength. It is also possible in accordance with the invention to reduce the thickness of the frame in the direction of the plane of the head, and such expedient will have the effect of reducing wind resistance to the movement of the racquet.

A strip 126 of multilayer graphite material permeated with resin and having dimensions of 29 cm×6 cm is illustrated in FIG. 24. The length of 29 cm is selected as substantially matching the circumference of the head of the badminton racquet being manufactured. As illustrated schematically in FIG. 25, strip 126 comprises layers which are at ±19° with respect to the length of strip 126. As illustrated in FIG. 26, a second strip 127, substantially identical to strip 126 is placed over strip 126. Following this a narrow strip 128, with graphite fibers oriented perpendicular to the length of the strip, is placed over the two strips, with the upper lengths of strips 126-128 all aligned, substantially as illustrated in FIG. 26. A keystone shaped piece 130 comprising, for example, two layers with orientations of plus and minus 30° is then added to give added strength and provide for the possibility of putting the strings under high tension. Generally, the assembly 132 of strips 126-130 will somewhat stick together because the resin is relatively tacky, even in its uncured state, thus making handling of the assembly relatively easy.

In accordance with a preferred embodiment of the invention, winding is performed using a two-part mandrel comprising mandrel parts 134 and 136. Mandrel parts 134 and 136 are placed in a tubular nylon sleeve 138, as illustrated in FIG. 28. Sleeve 138 has a characteristic of not melting under the application of heat. Accordingly, it is somewhat oversized, as illustrated in phantom lines in FIG. 29, when it is placed over mandrel parts 134 and 136. As illustrated in solid lines in FIG. 29, the excess portions of the sleeve are folded over themselves and over a length of double stick tape 140 in order to snugly and securely contain the mandrel parts. The excess portions of the sleeve also act to accommodate expansion of the sleeve as it pushes against the layers of graphite fiber permeated with resin. During this process, layers of resin may slide with respect to each other.

Mandrel parts 134 and 136 have a width of about 8 mm and a thickness of approximately 1.5 mm and may be made of, for example, steel. The mandrel is provided in two mandrel parts 134 and 136 in order to provide for removal of the mandrel from the layup without difficulty and while minimally disturbing the rolled layup, as more fully appears below.

Assembly 132 is then wrapped around the nylon sleeve 138 on mandrel parts 134 and 136, for example by rolling, as illustrated in FIG. 30. Rolling is continued as illustrated in FIG. 31. Before rolling has been completed, a pair of end strips 142 (constructed of fibers in a number of layers oriented at angles with respect to their length typical of the prior art) illustrated in FIG. 32 and a length strip 144 (of prior art length, width, fiber orientation and number of layers), as illustrated in FIG. 33 are positioned on the assembly 132, as illustrated in FIG. 34. Rolling is then continued until all the graphite layers have been rolled around the mandrel, as illustrated in FIG. 35. End strips 142 might have their graphite fibers oriented parallel to their length, while length strip 144 may comprised of graphite fibers oriented perpendicular to the length of the strip. The length, width, fiber orientation and number of layers of fibers are known in the prior art and form no part of the invention.

Following this, additional layers of graphite strips are wrapped to complete the layup. More particularly, another pair of end strips, for example, identical in orientation and size to end strips 142, and another length strip identical to strip 144 are positioned over the assembly illustrated in FIG. 35. Following that, a final wrapping sheet of two ply graphite fabric with fiber orientations at plus and minus 30° and having a width of approximately 4.5 to 7 cm is wrapped over the assembly illustrated in FIG. 35 to result in the assembly illustrated in FIG. 36.

When the layup is completed as illustrated in FIG. 36, mandrel part 134 is removed from the layup by the pulling of the same from the layup while the opposite end of nylon sleeve 138 is grasped by the other hand. With opposite motions, mandrel part 136 is removed from the layup leaving the inside of sleeve 138 open.

One gram of Expancell 152, which is designated by reference numeral 146, is then placed in the half cylindrical spoon portion 148 of spoon 150 (FIG. 37). Foam plastic forming material 146 is spread more or less evenly the entire length of spoon portion 148. Spoon portion 148 has a length which is approximately equal to half of the length of nylon sleeve 138. Spoon portion 148 is then inserted into layup 152 (FIG. 36). Spoon 150 is then rotated axially, releasing and substantially uniformly distributing foam plastic forming material 146 along one half of layup 152. The process is then repeated using another gram of Expancell 152 to fill the other half of layup 152.

Figure 39:
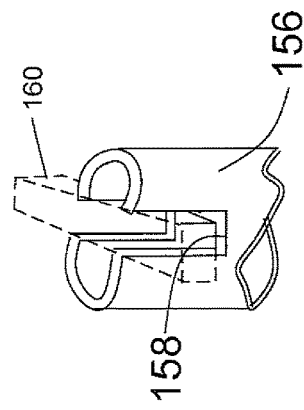
Figure 40:
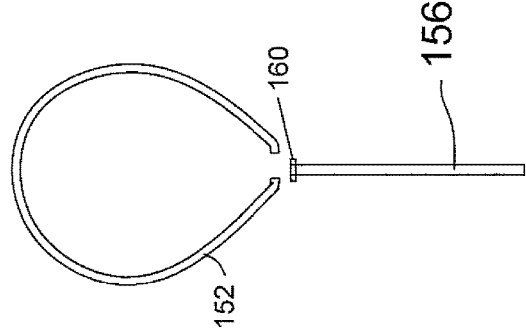

The ends of nylon sleeve 138 are then tied closed and the layup rotated and rolled by hand to further even out the distribution of foam plastic forming material 146. Layup 152 is then wrapped around a wooden mold 154 (FIG. 38) to form it generally in the shape of a badminton racquet frame. Referring to FIG. 39, a tubular member 156, which may be graphite composite or some other material, is then cut to form a slot 158 for receiving a crosspiece 160, which may be glued in position as illustrated. The parts are then arranged as shown in FIG. 40.

Figure 41:
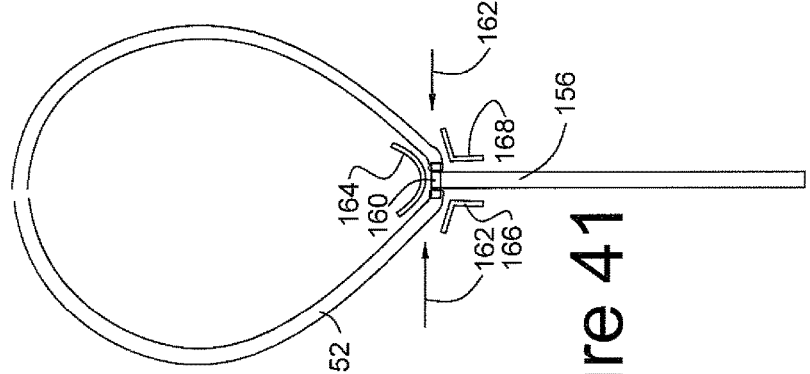

The ends of layup 152 are then pushed in the direction of arrows 162 over the ends of crosspiece 160, as illustrated in FIG. 41. Strips 164, 166 and 168, each of which may be 10 cm long and 1.5 cm in width, are then positioned as illustrated in FIG. 41, being pressed against the frame members to serve the function of binding them together in position. Strips 164, 166 and 168 may all be two ply graphite members with one layer aligned at +45° with respect to its length and the other layer aligned at −45° with respect to the length of the strip.

As is schematically illustrated in FIGS. 42-49, additional strips 170-184 are next applied to the layup for the badminton frame.

Strip 170 is applied in a u-shape as illustrated in FIG. 42. Strip 172 is wrapped around the head starting on the left side and wrapping around through the center and onto the right side of the head. Strip 174 is coiled around the handle of the racquet frame. Strip 176 is barbell shaped. Strip 176 is centered on the junction between the handle and the head or hoop and is then spirally wrapped tightly around both sides of the adjoining oval-shaped head portions. Referring to FIG. 46, elongated diamond shaped patch 178 is passed through the head, centered on the handle and both ends of the patch 178 are wrapped around and brought into contact with the handle, wrapping around its sides. An elongated parallelogram shaped patch 180 is then placed over diamond shaped patch 178, and pressed against the handle and other parts of the racquet.

Generally, it is noted that all wrapping of resin-permeated graphite fiber patches is done tightly and in close conformity to the already assembled portions of the frame structure. The stickiness of the resin saturating the graphite fiber patches facilitates this. As shown in FIG. 48, a second parallelogram patch 182 is positioned over the first parallelogram patch 180. As shown in FIG. 49, patches 184 and 186 are then adhered to the outside half-arch shaped portions of the racquet.

As shown in FIG. 50, the badminton racquet frame layup is placed in the cavity 188 of mold bottom 190. The mating top of the mold is then placed over mold bottom 190. Care should be taken not to pinch the graphite fibers. This is done by ensuring that the layup is contained in and positioned over cavity 188. The assembly is then heated to cure the resin. Heating may be done by putting the mold in an oven, or by circulating a hot liquid, such as water or oil, within passages provided in the mold for this purpose. In order to cure the graphite/resin members forming the layup, the layup should be heated to about 145° C. with a tolerance of plus or minus 5° C. However, this temperature depends upon the particular foam plastic forming material being used and any temperature, which achieves foaming, curing and expansion of the plastic, and sufficient pressure, is likely to result in the production of an excellent frame.

Heating should continue for about 25 minutes, although longer heating times do not appear to adversely affect the final product. The application of heat results in pressure being exerted against the graphite layers of the layup, forcing them against each other to form a strong structure and, perhaps, some shifting with respect to other layers during this process.

Once heating has been completed, it is best that the mold be cooled, for example by circulating cold water in the passages provided in the mold for the purpose of heating and cooling the mold. This is necessary so that the foam plastic formed by the Expancell 152 will solidify well, thus preventing, potentially, further expansion of the frame material upon removal of the racquet frame from the mold. Cooling to 10-15° C. has been found to result in the production of frames with excellent characteristics, although it is not believed that this particular temperature range is very critical. The racquet is then ready to be processed in a conventional manner by finishing, drilling holes, stringing and the application of an appropriate handle grip.

While, in principle, the mating mold halves may have passages for heating and cooling, it is also possible for a mold without such passages to be placed between a pair of metal plates with such passages, which may be used to receive hot and cold fluids for heating and cooling a two-part clamshell mold securely held between the metal plates.

The manufacture of a tennis racquet will now be described. The frame is made, as above, using a nylon tube snuggly secured around a mandrel using double stick tape. The process steps for making a tennis racquet frame are similar to those employed in the making of a badminton racquet, except that the amount of carbon fabric and foam plastic is substantially larger.

In accordance with the inventive fabrication of a tennis racquet using a number of graphite fabric strips, which are illustrated in FIG. 51, the layup 210, when formed into a racquet extends from the base of the handle of the racquet through the length of the handle, around the circumference of the head of the racquet and back along the length of the handle to the base of the handle of the racquet, as illustrated in FIG. 52. A throat is formed by a crosspiece 212 which completes the circumference of the head of the racquet. Crosspiece 212 may be made using the inventive process, although its characteristics are not at all critical because it is well supported and is short in length. Crosspiece 212 may be supported by spirally wound, sideways positioned, or other strips of graphite-resin fabric, as in the case of the badminton racquet manufacturing process described above. After the layup is formed it is put in the general shape of a tennis racquet my being formed around a wooden mold. Crosspiece 212 is then added and secured with strips of carbon fiber permeated with resin as described above. The fiber structure can then be completed by wrapping of the handle with several layers of graphite fiber with different orientations to give strength in all directions.

Referring to FIG. 51, a schematic exploded plan view of the primary parts of a tennis frame is illustrated. FIG. 51 does not show the parts of the crosspiece which define the throat of the tennis racquet frame, but the construction of the crosspiece will be described after the description of the construction of FIG. 51. It is noted that in this exploded view, parts which are identical have only been illustrated once in some cases as will be understood from the following.

After the sleeve has been wound and secured around the twin mandrels, a first strip 216 having a length of 155 cm is centered on the nylon sleeve and wound snugly thereon. Strip 216 comprises two layers of graphite fibers oriented at +30° and −30° with respect to the length. The strip has a width of 7.2 cm. The various strips of graphite/resin material are set forth below in the order in which they are wrapped over the nylon sleeve covering the mandrel. Next, strips 218 and 220 are positioned 74 cm from the centerline 222 of the layup. Strips 218 and 220 are trapezoidal in shape and have two layers of graphite fibers, one of them +30° with respect to the length and the other −30° with respect to the length of the strips. After strips 218 and 220 are applied, a second pair of strips identical to strips 218 and 220 (which have a width of 7.2 cm, and a long length of 11 cm and a short length of 9 cm) are next applied. Optionally, they may be positioned with opposite orientations up and down as illustrated. These strips are laid down over what will be the outside of the frame.

FIG. 51 may be understood as showing the distances of the various ends of the carbon fiber strips from the centerline 222 of the layup. Thus, strip 216 is centered on the layup, has a length of 155 cm and has ends which are each 77.5 cm from centerline 222. Similarly, strip 218 has a long length of 11 cm, a short length of 9 cm, and is positioned at a distance of 74 cm from centerline 222. The positions of the various ends and corners of the strips in centimeters from the centerline of the layup are given in FIG. 51.

Strip 224 is trapezoidal in shape and extends from a point 82 cm from centerline 222 (on the left) to a point 5 cm from centerline 222 (on the right). Strip 226 is a mirror image of strip 224. Strip 226 is trapezoidal in shape and extends from a point 82 cm from centerline 222 (on the right) to a point 5 cm from centerline 222 (on the left). Strips 224 and 226 are 87 cm long and have two ply graphite fiber strips with the layers extending at +10° and −10° with respect to the length of the strip. After strips 224 and 226 are applied, an identical pair of strips are applied over them.

Strip 228, which has a length of 130 cm is also a two-ply graphite fiber construction with layers at +30° and −30° with respect to their length. Such a strip is also applied twice, optionally positioned upside down from top to bottom during the second application. Unlike strips 216-226, strips 228 are applied to what becomes the inside of the racquet frame. Strips 224, 226, and 228 all have a width of 7.2 cm.

Strip 230, which has a length of 92 cm and a width of 2 cm, is applied to the outside of the racquet head and comprises fibers which are transverse to the length of strip 230. It is noted that when the graphite fiber fabric strips are applied, they are handled while they are still on the release paper (as is preferably the case with all graphite fiber strips used in the method of the present invention). This is particularly important in the case of strip 230. After they are applied to the layup, the release paper is pulled off.

Strip 232, which has a width of 0.5 cm, has two layers with fibers parallel to its length. It is wrapped on the outside of the racquet layup. Strip 232 is applied to that portion of the layup which becomes the face of the racquet. A second strip identical to strip 232 is applied to what becomes the opposite face of the racquet.

Strip 234, which has a width of 2 cm, has a length of 12 cm and comprises two layers of graphite fibers, one of the layers having fibers parallel to the length of the strip and the other having fibers perpendicular to the length of the strip.

After a first strip 234 is applied to the inside of the layup, a second identical strip 234 is applied to the outside of the layup.

Strips 236 have a width of 3 cm and are two layer constructions with graphite oriented at +10° and −10° with respect to the length of the strips. After a first set of strips 236 have been applied to the outside of the layup, a second set of strips 236 are applied to the inside of the layup.

Strip 238 has a width of 2 cm and a length of 90 cm and is applied to the inside of the layup. Strip 240 has a width of 7.5 cm and is applied to the inside of the layup. Strip 240 is a two layer structure with layers oriented at +30° and −30° with respect to its length. Two strips 240 are applied to the inside of the layup.

Strip 242 has a width of 7.9 cm and a length of 122 cm, and is comprised of two layers with fibers oriented at +10° and −10° with respect to the length of strip 242. Two such strips 242 are applied to the outside of the layup.

Strip 244 has a length of 155 cm and a width of 8 cm, and is a two layer construction with graphite fibers oriented at +30° in −30° with respect to the length of strip 244. Two such strips 244 are applied to the outside of the layup.

Each strip 246 has a width of 7.5 cm and a length of 11 cm. The strips 246 are two layer structures with fibers oriented at +30° and −30° with respect to the length of the strips. Four such pairs of strips 246 are wrapped around the outside of the layup.

Strip 248 has a width of 2 cm and a length of 10 cm, and comprises a two ply structure with fiber orientations at +10° and −10°. Two such strips 248 are applied to the inside of the layup. As with other trapezoidal and parallelogram shaped strips, positions may be reversed from top to bottom, as illustrated, with the second set of strips to achieve symmetry in the structure. Two such strips 248 are used.

Strip 250 has a width of 3 cm, and comprises a four ply structure, with graphite layers oriented at +10°, −10°, +30°, and −30°.

In connection with the above, it is again noted that any structure built using the conventional air pressure system using an external air pressure source may be used identically or adapted to the reduction in the amount of material needed and used to implement the inventive method.

After the main portion of the frame layup is completed using the strips illustrated in FIG. 51, 25 g of Expancell 152 is loaded in the nylon sleeve on which the graphite/resin strips are wrapped. This is done in two doses, each of 12.5 g which are inserted in each half of the layup corresponding to the mandrel on which the layup was wrapped. Following the introduction of Expancell 152, the ends of the nylon sleeve are knotted or otherwise closed to ensure that pressure will be maintained during foaming of the plastic core.

A layup for crosspiece 212 is then constructed by wrapping on a mandrel covered by a tubular nylon member snugly secured thereto by double stick tape, for example ordinary double stick tape of the sort used in office clerical applications. As in the example of a badminton racquet above, the various strips of graphite/resin material are set forth below in the order in which they are wrapped over the nylon sleeve covering the two mandrels.

The first strip measuring 6 centimeters in width and 12 cm in length is first wrapped over the nylon sleeve. Its fibers are oriented at +30° and at −30° with respect to the length of the strip. The strip is followed by another strip with fibers oriented at +10° and −10° with respect to the length of the strip, and having a length of 11 cm and a width of 11 cm. Next a strip with fibers oriented at +30° and −30° with respect to the length, and having a length of 21 cm, a width of 11 cm and having its ends tapered over a distance of approximately 2.5 cm is wrapped around the prior layers.

Another strip, having a length of 10 cm and a width of 2 cm, also comprising two layers, but with fiber orientations at +10° and −10° with respect to the length of the strip, is then added to the assemblage. This strip is wrapped over what becomes the inside of the head of the racquet.

Another strip, having a length of 10 cm and a width of 2 cm, also comprising two layers but with fiber orientations at 90° and 0° with respect to the length of the strip is then added to the assemblage. This strip is centered and wrapped over what becomes the outside of the head of the racquet.

Next a strip with fibers oriented at +30° and −30° with respect to the length, and having a length of 21 cm, a width of 4.5 cm and having its ends tapered over a distance of approximately 2 cm is wrapped around the prior layers. After this, a strip with fibers oriented at +30° in −30° with respect to the length, and having a length of 10 cm and a width of 7 cm, is wrapped around the prior layers.

After the layup for crosspiece 212 has thus been formed and the mandrel removed, 2 g of Expancell 152 are introduced into the nylon sleeve upon which the layup for crosspiece 212 has been wrapped. The ends of the nylon sleeve are then knotted closed, preferably with knots positioned in the tube defined by the graphite layers of the crosspiece layup. This completes the construction of the crosspiece layup. Optionally, one may omit the step of knotting the ends of the nylon sleeve on the crosspiece layup, as the mold and pressure from adjoining portions of the head portion of the main layup will exert pressure (due to expansion of the foam) and seal the ends of the crosspiece layup during heating and curing.

As shown in FIG. 52, layup 214 comprises crosspiece 212 and mainframe portion 210. The same are put into the desired shape using a wooden form as illustrated FIG. 53 before receiving additional strips and patches of resin permeated fiberglass, and being put in an iron mold bottom member 216, as illustrated in FIG. 54. The wooden form comprises a head support 218 and a throat support 220. After this, additional strips and patches are added to the layup as will be described below. After this, the finished layup may be placed in the iron mold bottom member 216, as shown in FIG. 54.

Referring to FIG. 55, the knotted ends of the nylon sleeve, with knots 218 may extend from the iron mold. Alternatively, as illustrated in FIG. 56, knots 222 may be tucked in between the filled layup, and the mold may be configured to form a flat bottom, thus eliminating the need for sawing at the base of the handle as in the embodiment of FIG. 55.

Referring to FIG. 57, the process for attaching crosspiece 212, by wrapping the additional strips and patches referred to above, may be better understood.

More particularly, as illustrated in FIG. 57, crosspiece layup 224 receives a second tubular graphite/resin support member. This second tubular graphite/resin member is constructed by rolling into a tube a two layer graphite strip permeated with resin, having a length of 10 cm and a width of 21 cm with tapered ends, and having its layers oriented at +30° and −30° with respect to the length the strip. The tube should have a diameter such that when the support member 226 is flattened, it has a width which is a little less than the thickness of the finished racquet frame.

This second tubular graphite/resin member is constructed by rolling into a tube a two layer graphite strip permeated with resin, having a length of 10 cm and a width of 7 cm, and having its layers oriented at +30° in −30° with respect to the length the strip. The tube should have the diameter such that when the support member 226 is flattened, it has a width which is a little less than the thickness of the finished racquet frame.

Another graphite/resin strip 228 is rolled around the combination of crosspiece layup 224 and support member 226. Strip 228 is a two layer graphite strip permeated with resin, having a length of 10 cm and a width of 7 cm, and having its layers oriented at +30° and −30° with respect to the length of the strip. The strip 228 is wrapped around the central portion of the combination of crosspiece layup 224 and support member 226, as illustrated in FIG. 58.

After crosspiece layup 224 has been constructed, it is positioned on the wood form of FIG. 53 together with the main portion 210 of the racquet frame, to which it is to be secured. The ends 230 and 232 of crosspiece layup 224 and support member 226, respectively, are bent away from each other as illustrated in FIG. 59. Main portion 210 and the combination of crosspiece layup 224 and support member 226 are then put on the wood form of FIG. 53. The relative position of the frame elements may be better understood from FIG. 60 which omits the illustration of the wood form for purposes of clarity of illustration. All four ends 230 and 232 are then bound by strips of graphite fibers permeated with resin having a length of about 12 cm and a width of about 1 cm. These may be single ply graphite fiber strips with fibers oriented along the length of the strip. Binding is done by smoothly spirally winding the same with slight overlap to the extent possible between the edges of the strip as indicated schematically by the spirals 234 in FIG. 60. While spirals are not illustrated for the other ends, they are wrapped in the same manner.

The handle portion of the frame is wrapped with two strips of carbon fiber fabric each having a two layer construction with fibers running +30° and −30° with respect to the length of the strip. The strips are both 17 cm long and 4 cm wide.

The finished layup is then removed from the wooden form and placed in the bottom half of an iron mold for heating. In the event that a closed-handle iron mold, such as that illustrated in FIG. 61 is used, one may dispense with knotting the ends of the nylon sleeve forming the layup for the main portion 210. The ends of the nylon sleeve may simply be folded over and positioned between the two ends of the main portion of the layup. Such simple folding over may optionally be employed for the ends of the nylon sleeve of the crosspiece, taking care to tuck them into the tube formed by the wound graphite layers that make up the crosspiece.

In accordance with the invention it is also possible for a graphite composite member to be manufactured without the use of any impermeable members, such as the tubular nylon sleeve. In this case, graphite strips are wound directly upon a mandrel, perhaps with the first layers of resin permeated graphite having one side coated with a parting agent, such as an inert powder to prevent them from sticking to the mandrel. The tubular layup may then be built by successive wrapping of additional graphite/resin strips. When wrapping of the layup is completed, the finished layup may have its ends folded over upon themselves to substantially seal them and then the part, for example a tennis racket, may be put in a closed mold, such as that illustrated in, for example, FIG. 56. In addition, it is also possible to use an open, for example, half cylindrical mandrel having the configuration of spoon 150, and having plastic forming material (for example Expancell 152) in its spoon portion 148 prior to wrapping of the layup. It may be also desirable to make spoon portion 148 square in cross-section or some other shape. When using such a spoon mandrel, after the layup has been wrapped, the layup need simply be rotated to allow the plastic forming material to fall on the inside surface of the layup and then to remove the spoon, and fold over the ends to seal them before placing them in a mold for heating and curing as shown in FIG. 56.

Turning to FIG. 61, a particularly advantageous embodiment of the invention is illustrated. In this embodiment, a tennis racket layup 310 is made up of two tubular members, namely inner tubular member 312 and outer tubular member 314. Inner tubular member 312 and outer tubular member 314 are each made substantially in the same manner as the tubular layups described above, and comprise an inner tubular member filled with a heat activated expandable material such as Expancell and sealed, and covered with members comprising graphite fiber permeated with a thermoplastic or thermal setting material.

As can be seen from FIG. 62, inner tubular member 312 is shorter than outer tubular member 314 because it merely extends around the head of the racquet, starting at end 316 and extending around the head in a counterclockwise direction, ending at end 318 which is positioned adjacent end 316. After being heated in a tennis racket mold, end 316 is joined and fused to end 318 at juncture 320, as illustrated in FIG. 63.

Optionally, a number of binding strips 322 of graphite fiber permeated with thermosetting or thermoplastic resin may be used. A smaller number of longer binding strips, or a larger number of narrower binding strips or a combination of the same may be used. For example, twenty-five 1 cm wide strips may be dispersed uniformly throughout the frame.

After tennis racket layup 310 has been completed, it is placed in a mold 324 in accordance with the preferred embodiment, as illustrated in FIG. 61. In accordance with the invention, as in the previously described embodiments, the layup is placed in the mold, and the mold is closed and heated causing the powder to expand and drive the graphite and resin to the inter surfaces of the mold, causing it to take the form of the mold. At the same time, inner tubular member 312 is very securely fused to outer tubular member 314. In this embodiment, it is noted that bridge portion 326 is, accordingly, very securely fused to the remaining portions of the finished racket. In addition, the structure is more uniform compared to the earlier described embodiments and thus does not have discontinuities in its characteristics.

At the same time, the outer tubular member extends from the base of the handle of the racquet, around the head of the racquet and back to the base of the handle of the racquet in a single continuous member thus providing strength to the handle 328 and the handle extensions 330 by which the handle is secured to the head 332.

In accordance with the preferred embodiment, those portions of outer member 314 which form part of the head may be made with less material than other portions of outer member 314 because they are reinforced by portions of inner member 312. Likewise, those portions of inner member 312 which form part of the head may be made with less material than other portions of inner member 312 because they are reinforced by portions of outer member 314.

In principle, it is also noted that inner tubular layup 312 may be filled with Expancell or other similar foaming plastic and outer tubular layup 314 may be inflated with air thus giving a hybrid performance characteristic in the finished racket frame.

While illustrative embodiments of the invention have been disclosed, it is understood that various modifications of the inventive method and the materials used will be obvious to those of ordinary skill in the art in view of the above description and specification. In addition to these obvious modifications, the invention may be applied in other areas. For example, the inventive technique may be used to form a bicycle frame in which different orientations are applied to different parts of the frame to address the stresses formed at those parts of the frame during use. Such variations are within the spirit and scope of the invention which is limited and defined only by the appended claims.

The invention claimed is:

1. A method of making a fiber composite member, comprising:
   (a) forming flat members of fiber permeated with resinous material;
   (b) wrapping said flat members to form a tubular member portion, said tubular member portion having first and second ends;
   (c) effecting placement of a foam plastic forming material, said foam plastic forming material comprising capsules filled with heat expandable material, said foam plastic forming material being positioned within the tubular member portion form by said wrapped flat members;
   (d) substantially closing the ends of the tubular member portion comprising said wrapped flat members to define a substantially closed bladder;
   (e) introducing said closed bladder into a mold;
   (f) heating said tubular member portion containing said foam plastic forming material to cause said foam plastic forming material to expand and form a foam plastic and apply pressure sufficient to form a fiber composite member; and
   (g) hardening said resinous material to form said fiber composite member.

2. A method of making a fiber composite member as in claim 1, wherein said wrapping of said flat members is performed around a flexible tubular sleeve, said expansion agent is placed in said flexible tubular sleeve.

3. A method of making a fiber composite member as in claim 1, wherein said wrapping of said flat members is performed around a flexible tubular sleeve while a rigid member is positioned in said sleeve to facilitate wrapping of said fiber permeated members.

4. A method of making a fiber composite member, comprising:
   (a) forming flat members of fiber permeated with resinous material;
   (b) assembling said flat members into a unitary member having at least one wall portion;
   (c) positioning a bladder forming member adjacent one side of said at least one wall portion of said unitary member;
   (d) effecting distributed placement of an expansion agent in said bladder forming member, said expansion agent being positioned adjacent to said at least one wall portion of said unitary member, and effecting distributed placement of weights having first and second opposite ends, wherein said expanded expansion agent bears against said first and second opposite ends;
   (e) introducing said unitary member and said bladder forming member into a mold;
   (f) closing said bladder forming member to form a substantially closed bladder;
   (h) after said distributed placement has been effected, causing said expansion agent to expand and apply pressure to said at least one wall portion; and (i) hardening said resinous material, wherein said unitary member is in the form of a sports racket having a head portion and a handle portion, said head portion being defined by a tubular unitary member portion, said handle portion being positioned proximate to said head portion.

5. A method as in claim 4 wherein said mold is a closed mold and closes said bladder.

6. A method as in claim 4 wherein said flat members are wrapped around said bladder forming member.

7. The method as in claim 4, wherein said expansion agent is a heat activated encapsulated foam plastic forming material.

8. A method of making a fiber composite member, comprising:
(a) forming flat members of fiber permeated with resinous material,
(b) assembling said flat members into a tubular unitary member having at least one wall portion;
(c) positioning a bladder forming member adjacent one side of said at least one wall portion of said unitary member;
(d) effecting distributed placement of an encapsulated expansion agent within said bladder forming member, said expansion agent being positioned adjacent said at least one wall portion of said unitary member;
(e) introducing said unitary member and said bladder forming member into a mold;
(f) closing said bladder forming member to form a substantially closed bladder;
(h) after said distributed placement has been effected, causing said expansion agent to expand and apply pressure to said at least one wall portion; and
(i) hardening said resinous material,
wherein said effecting distributed placement of said expansion agent in said bladder forming member is performed by distributing a quantity of said expansion agent onto an elongated spoon member and inserting said spoon member with said expansion agent into said bladder forming member.

9. A method as in claim 8 wherein said mold is a closed mold and closes said bladder.

10. A method as in claim 8 wherein said flat members are wrapped around said bladder forming member.

11. The method as in claim 8, wherein said expansion agent is a heat activated encapsulated foam plastic forming material.

\* \* \* \* \*